US012681714B2

(12) United States Patent
Tabuki

(10) Patent No.: US 12,681,714 B2
(45) Date of Patent: Jul. 14, 2026

(54) INFORMATION PROCESSING SYSTEM, INFORMATION PROCESSING TERMINAL, AND STORAGE MEDIUM

(71) Applicant: CANON KABUSHIKI KAISHA, Tokyo (JP)

(72) Inventor: Masumi Tabuki, Oita (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 18/331,835

(22) Filed: Jun. 8, 2023

(65) Prior Publication Data

US 2023/0409310 A1 Dec. 21, 2023

(30) Foreign Application Priority Data

Jun. 20, 2022 (JP) ................................. 2022-098621

(51) Int. Cl.
G06F 9/445 (2018.01)
G06F 8/65 (2018.01)
(52) U.S. Cl.
CPC ..................................... G06F 8/65 (2013.01)
(58) Field of Classification Search
CPC ..... G06F 8/65; G06F 8/71; G06F 8/61; G06F 8/60; G06F 3/123; G06F 16/23; G06F 16/2329; H04L 67/10; H04L 41/082; H04W 84/12
See application file for complete search history.

(56) References Cited

U.S. PATENT DOCUMENTS

| | | | | |
|---|---|---|---|---|
| 9,529,602 | B1 * | 12/2016 | Swierk | ................ G06F 9/45558 |
| 2006/0293048 | A1 * | 12/2006 | Swanson | .............. G08B 25/016 |
| | | | | 455/422.1 |
| 2017/0123736 | A1 | 5/2017 | Park | |
| 2020/0065217 | A1 * | 2/2020 | Bhosale | ................ H04L 67/025 |

FOREIGN PATENT DOCUMENTS

| | | |
|---|---|---|
| JP | 2006285951 A | 10/2006 |
| JP | 2013109450 A | 6/2013 |
| JP | 2019133407 A | 8/2019 |

* cited by examiner

*Primary Examiner* — Chuck O Kendall
(74) *Attorney, Agent, or Firm* — Canon U.S.A., Inc. IP Division

(57) ABSTRACT

An information processing system includes an information processing apparatus, an information processing terminal, and a management server, includes an acquisition unit configured for the information processing terminal to acquire predetermined information on the information processing apparatus, a communication unit configured to perform communication between the information processing terminal and the management server using the predetermined information, a first transmission unit configured to transmit a recovery program from the management server to the information processing terminal, a second transmission unit configured to transmit the recovery program from the information processing terminal to the information processing apparatus, and an execution unit configured to execute, in the information processing apparatus, a recovery process based on the recovery program.

17 Claims, 19 Drawing Sheets

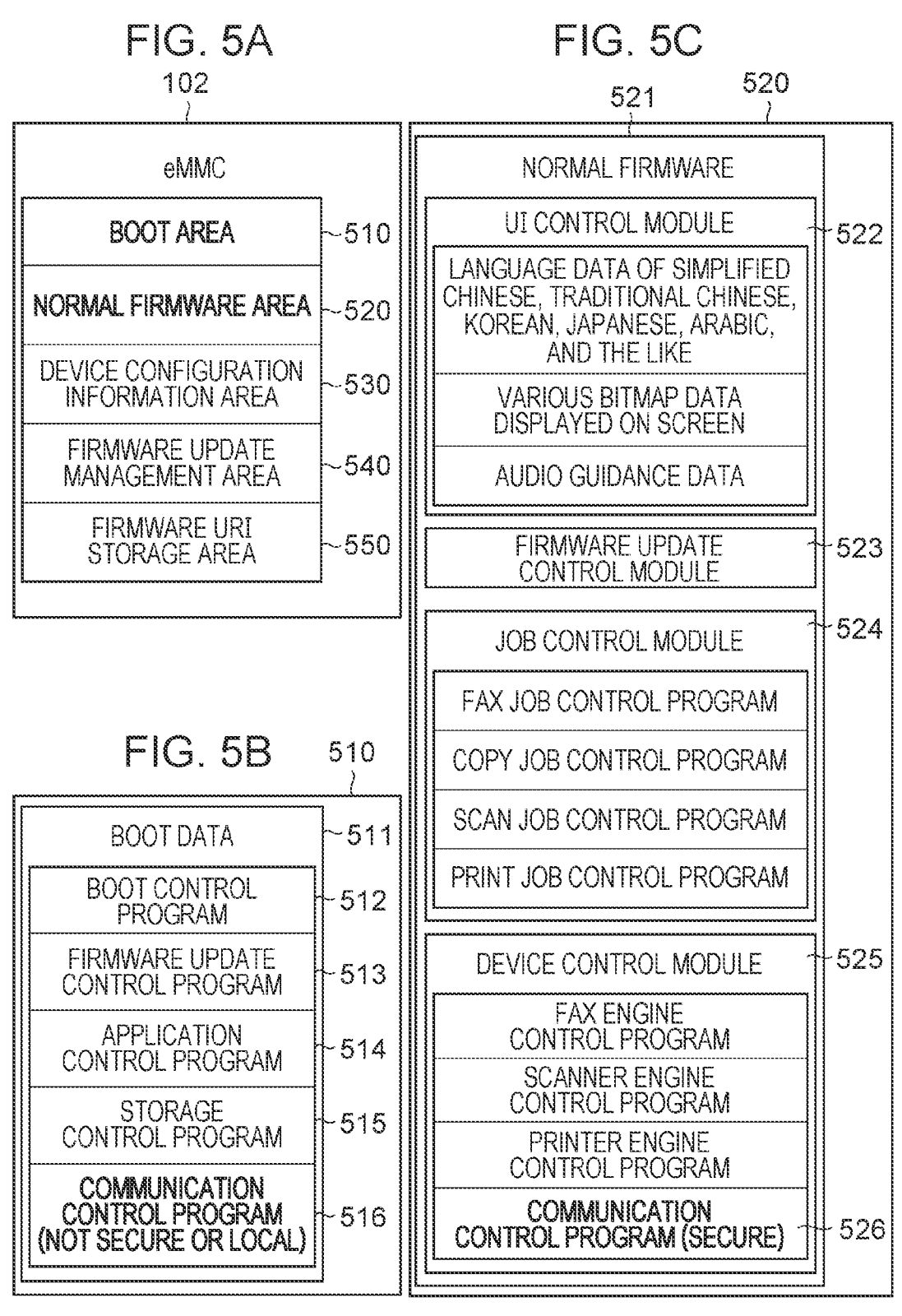

FIG. 5A

102 eMMC

| BOOT AREA | ~510 |
| NORMAL FIRMWARE AREA | ~520 |
| DEVICE CONFIGURATION INFORMATION AREA | ~530 |
| FIRMWARE UPDATE MANAGEMENT AREA | ~540 |
| FIRMWARE URI STORAGE AREA | ~550 |

| BOOT DATA | ~511 |
| BOOT CONTROL PROGRAM | ~512 |
| FIRMWARE UPDATE CONTROL PROGRAM | ~513 |
| APPLICATION CONTROL PROGRAM | ~514 |
| STORAGE CONTROL PROGRAM | ~515 |
| COMMUNICATION CONTROL PROGRAM (NOT SECURE OR LOCAL) | ~516 |

FIG. 5C 521          520

NORMAL FIRMWARE

UI CONTROL MODULE          ~522

LANGUAGE DATA OF SIMPLIFIED CHINESE, TRADITIONAL CHINESE, KOREAN, JAPANESE, ARABIC, AND THE LIKE

VARIOUS BITMAP DATA DISPLAYED ON SCREEN

AUDIO GUIDANCE DATA

FIRMWARE UPDATE CONTROL MODULE          ~523

JOB CONTROL MODULE          ~524

FAX JOB CONTROL PROGRAM

COPY JOB CONTROL PROGRAM

SCAN JOB CONTROL PROGRAM

PRINT JOB CONTROL PROGRAM

DEVICE CONTROL MODULE          ~525

FAX ENGINE CONTROL PROGRAM

SCANNER ENGINE CONTROL PROGRAM

PRINTER ENGINE CONTROL PROGRAM

COMMUNICATION CONTROL PROGRAM (SECURE)          ~526

1101

CONNECT VIA Wi-Fi TO PORTABLE TERMINAL
IN WHICH PRINTER MANAGEMENT
APPLICATION IS INSTALLED,
AND PERFORM RECOVERY PROCESS.

SSID : RECOVERY_MODE_XXXX
PASS : 7654321

1102

CONNECT MAIN UNIT VIA USB CABLE TO
PORTABLE TERMINAL IN WHICH PRINTER
MANAGEMENT APPLICATION IS INSTALLED,
AND PERFORM RECOVERY PROCESS.

FIG. 12

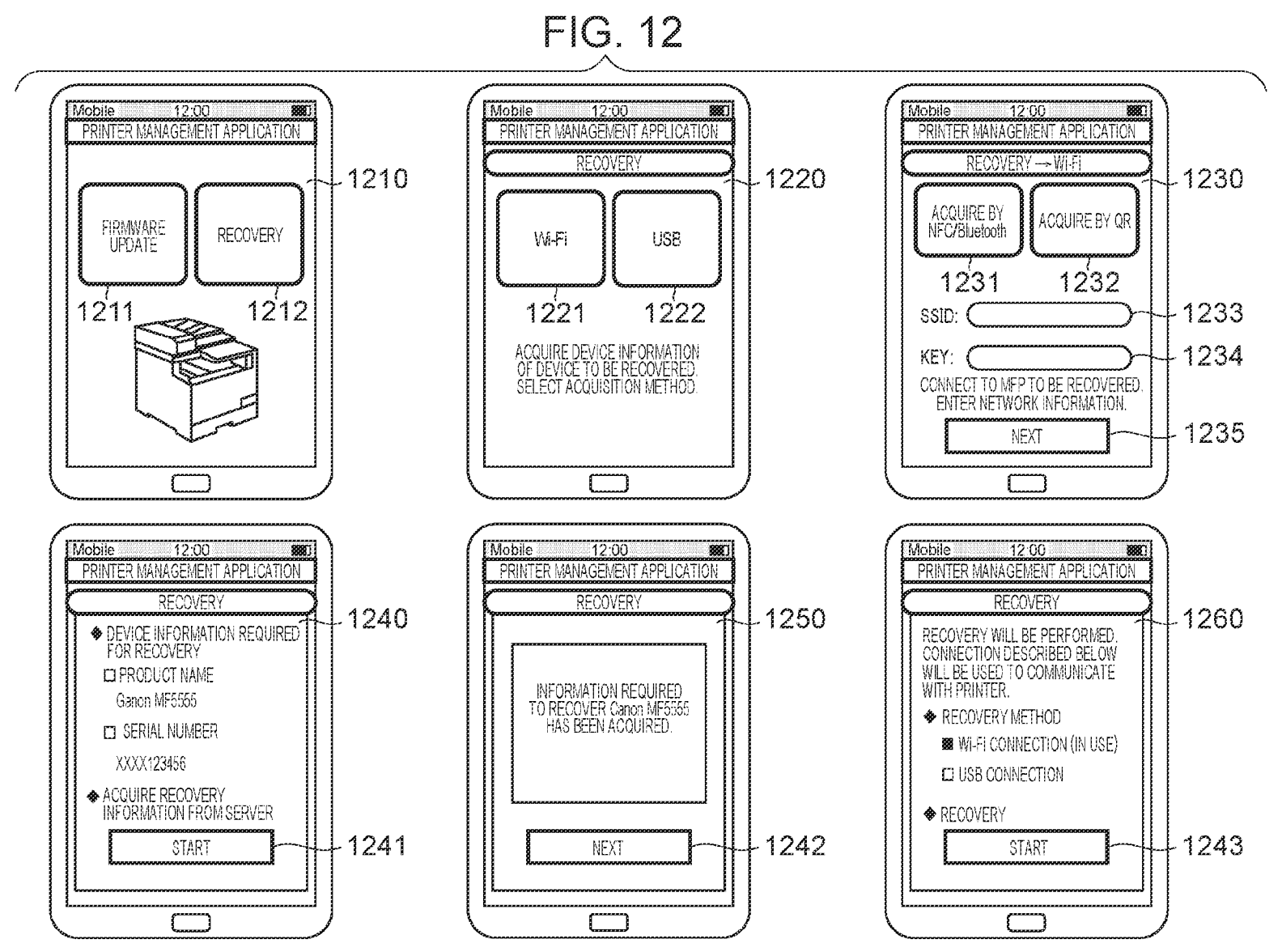

Screen 1210

Mobile  12:00
PRINTER MANAGEMENT APPLICATION

FIRMWARE UPDATE  1211

RECOVERY  1212

Screen 1220

Mobile  12:00
PRINTER MANAGEMENT APPLICATION

RECOVERY

Wi-Fi  1221    USB  1222

ACQUIRE DEVICE INFORMATION OF DEVICE TO BE RECOVERED. SELECT ACQUISITION METHOD.

Screen 1230

Mobile  12:00
PRINTER MANAGEMENT APPLICATION

RECOVERY → Wi-Fi

ACQUIRE BY NFC/Bluetooth  1231    ACQUIRE BY QR  1232

SSID:  1233
KEY:  1234

CONNECT TO MFP TO BE RECOVERED. ENTER NETWORK INFORMATION.

NEXT  1235

Screen 1240

Mobile  12:00
PRINTER MANAGEMENT APPLICATION

RECOVERY

◆ DEVICE INFORMATION REQUIRED FOR RECOVERY

☐ PRODUCT NAME
  Canon MF5355

☐ SERIAL NUMBER
  XXXX123456

◆ ACQUIRE RECOVERY INFORMATION FROM SERVER

START  1241

Screen 1250

Mobile  12:00
PRINTER MANAGEMENT APPLICATION

RECOVERY

INFORMATION REQUIRED TO RECOVER Canon MF5355 HAS BEEN ACQUIRED.

NEXT  1242

Screen 1260

Mobile  12:00
PRINTER MANAGEMENT APPLICATION

RECOVERY

RECOVERY WILL BE PERFORMED. CONNECTION DESCRIBED BELOW WILL BE USED TO COMMUNICATE WITH PRINTER.

◆ RECOVERY METHOD
  ◉ Wi-Fi CONNECTION (IN USE)
  ☐ USB CONNECTION

◆ RECOVERY

START  1243

◆ FIRMWARE LIST ACQUISITION REQUEST

GET https://fw-server01.xxxx.com/mfxxxx/update/contents.xml HTTP/1.1\r\n

1720

◆ AUTHENTICATION REQUEST BASED ON SERIAL NUMBER

POST https://fw-server01.xxxx.com/mfxxxx/SerialTarget.do;id=OTUwMzQ4NTI4 HTTP/1.1\r\n
  "serialid" = "SNO11111"\r\n
  "action" = "authent"\r\n

1730

◆ AUTHENTICATION REPORT (FIRMWARE LIST)

```
<?xml version="1.0" encoding="UTF-8" ?>
<update-information>
 <header>
  <information version="0001" />
 </header>
 <body>
    <div id="container">\r\n
```
1731
```
    <content ="0;uri=http://fw-server01.xxxx.com/mfxxxx/6/0400003246/11/mfxxxx_MainController_V04.08.bin">\n
    <content ="X;uri=http://fw-server01.xxxx.com/mfxxxx/8/0400006198/01/mfxxxx_recovery_driver.bin">\n
```
```
    </div>
 </body>
</update-information>
```
1732

INFORMATION PROCESSING SYSTEM, INFORMATION PROCESSING TERMINAL, AND STORAGE MEDIUM

BACKGROUND

Field

The present disclosure relates to an information processing system for updating firmware of an information processing apparatus and an information processing terminal used in this system. The present disclosure can be applied to various information processing apparatuses such as a printer, a scanners, a facsimile machine, a multifunctional apparatus having such functions, an image processing apparatus, and also a PC, a smartphone, etc.

Description of the Related Art

Information processing apparatuses, including image processing apparatuses such as MFPs, frequently update their firmware to add or modify functions. If the power of the apparatus is turned off in the middle of such a firmware update, the apparatus will go into a malfunctioning state. Japanese Patent Laid-Open No. 2013-109450 discloses a technique for recovering firmware that has failed to be updated. More specifically, in this technique, normal firmware and firmware for recovery are stored in a storage of an information processing apparatus. According to such a configuration, when one of the two pieces of firmware fails, it is possible to easily perform a recovery process using the other piece of firmware that has not failed.

SUMMARY

According to an aspect of the present disclosure, an information processing system includes an information processing apparatus, an information processing terminal, and a management server, includes an acquisition unit configured for the information processing terminal to acquire predetermined information on the information processing apparatus, a communication unit configured to perform communication between the information processing terminal and the management server using the predetermined information, a first transmission unit configured to transmit a recovery program from the management server to the information processing terminal, a second transmission unit configured to transmit the recovery program from the information processing terminal to the information processing apparatus, and an execution unit configured to execute, in the information processing apparatus, a recovery process based on the recovery program.

Further features of the present disclosure will become apparent from the following description of exemplary embodiments with reference to the attached drawings.

BRIEF DESCRIPTION OF THE DRAWINGS

FIG. 5A is a diagram showing a data structure in an eMMC in the image forming apparatus, FIG. 5B is a diagram showing a data structure of a BOOT storage area, and FIG. 5C is a diagram showing a data structure of an area in which normal firmware is allowed to be stored.

FIG. 12 is a diagram illustrating screen transitions on a terminal in recovery processing.

FIG. 13 is a flowchart showing a processing flow performed in the image forming apparatus when power is turned on.

FIG. 17 is a diagram illustrating a structure of communication data.

DESCRIPTION OF THE EMBODIMENTS

Specific embodiments will be described in detail below with reference to the accompanying drawings. It should be noted that the following examples do not limit the scope of the present disclosure. Although a plurality of features are described in the embodiments, not all of these features are essential to the present disclosure, and two or more of these features may be combined arbitrarily.

Embodiments

System

Figure 1:
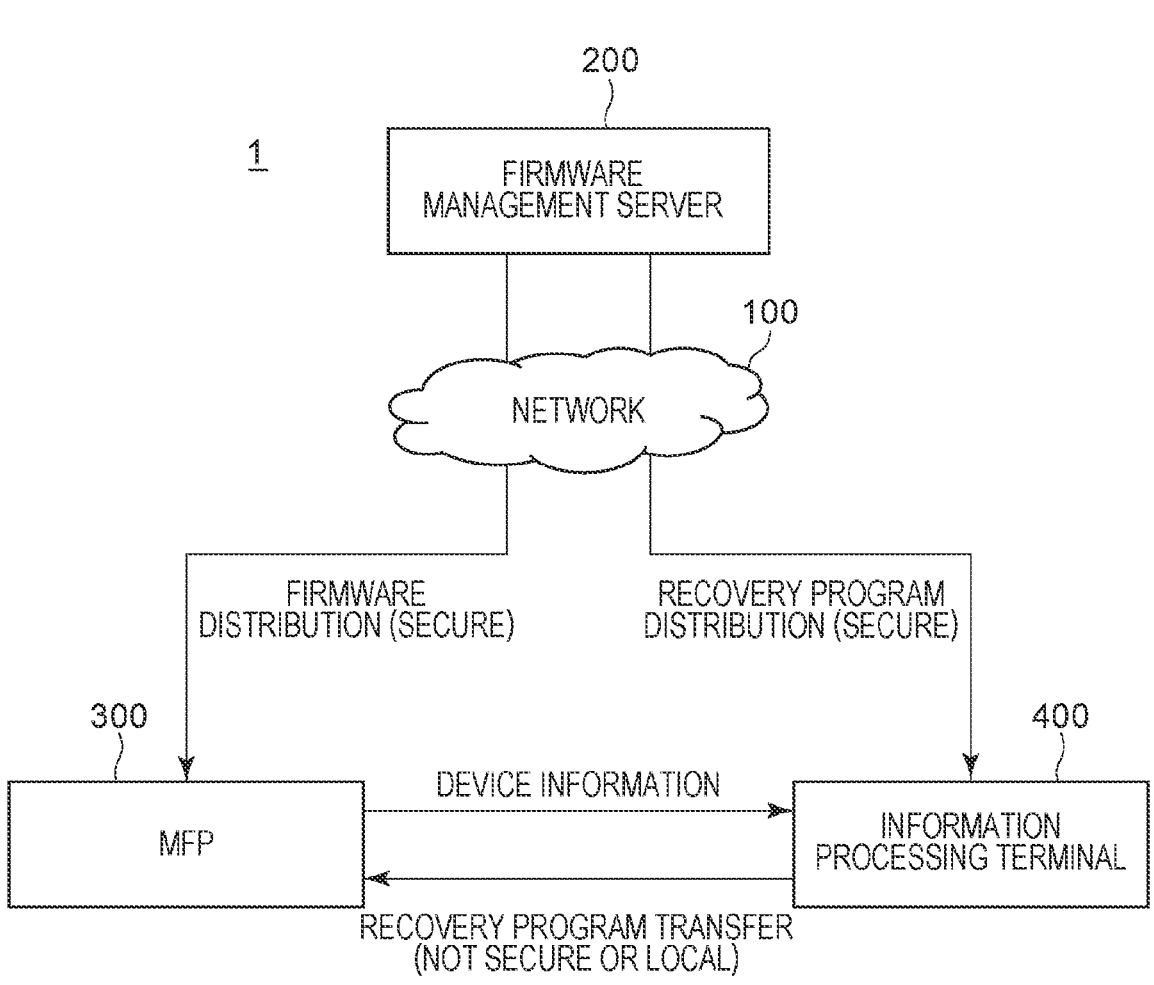
FIG. 1 is a diagram showing a configuration of a system.

FIG. 1 is a diagram showing an example of a system configuration according to the present disclosure. As shown in FIG. 1, a firmware management system 1 is an information processing system including an MFP 300 (an image forming apparatus), a firmware management server 200, and an information processing terminal 400. These apparatuses are communicably connected via a network 100. Firmware of the MFP 300 is updated by firmware distributed from the firmware management server 200. If the firmware update fails, the firmware management server 200 distributes a recovery program to the information processing terminal 400. The information processing terminal 400 provides the recovery program to the MFP 300 via a wireless direct connection, a wired connection, or the like. Upon receiving the recovery program, the MFP 300 executes firmware recovery processing. Note that the communication via the network 100 is performed securely using an encryption communication protocol or the like.

Figure 6:
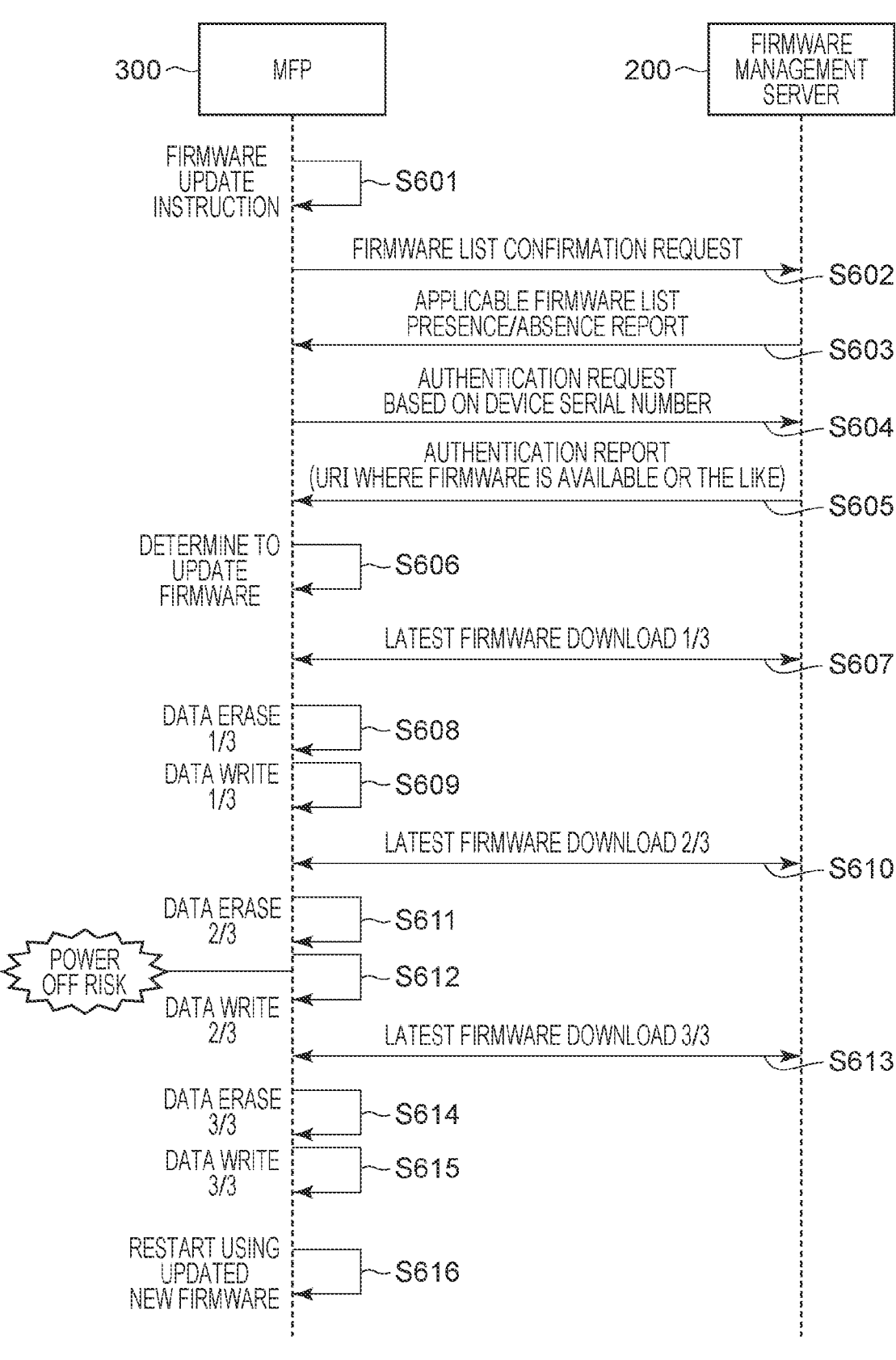
FIG. 6 is a diagram showing a sequence of a firmware update procedure.

A flow of firmware update processing in this system is described with reference to FIG. 6. FIG. 6 is a diagram showing a sequence of firmware update processing.

Figure 8A:
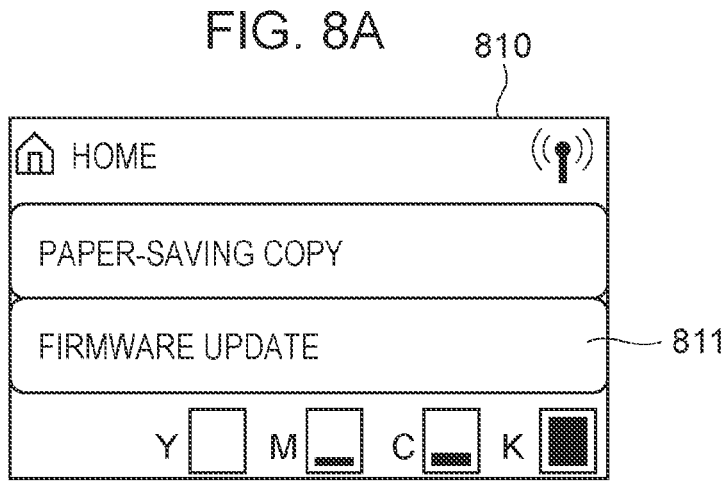
FIG. 8A is a diagram showing a menu screen displayed on an image forming apparatus.
Figure 8B:
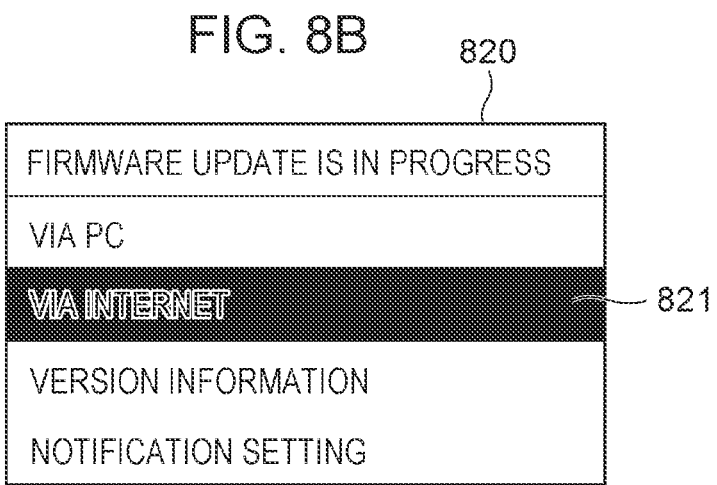
FIG. 8B is a diagram showing a firmware update screen displayed on the image forming apparatus.

In S601, the MFP 300 accepts a firmware update instruction. This firmware update instruction is issued via a screen displayed on the MFP 300. FIG. 8A is a diagram showing a menu screen displayed on the MFP 300. FIG. 8B is a diagram showing a firmware update screen displayed on the image forming apparatus. On the menu screen 810 shown in FIG. 8A, functions and settings of the MFP 300 are displayed in the form of a list. When a firmware update button 811 on the screen 810 is selected, the screen changes to a screen 820. When a firmware update method is specified on the screen 820, the MFP 300 accepts it as a firmware update instruction. Here, it is assumed that Via Internet button 821 is selected as the firmware update method, and accepted as the firmware update instruction.

In S602, the MFP 300 requests the firmware management server 200 to provide an updated firmware confirmation list.

In S603, the firmware management server 200 returns information indicating whether or not there is a list of firmware applicable to the MFP 300. In a case where there is a list of firmware applicable to the MFP 300, a response which is common in HTTP such as "HTTP/1.1 200 OK" is returned. The details of the error code are standardized by RFC7231 and the like, and thus a description thereof is omitted.

In S604, the MFP 300 notifies the firmware management server 200 of a serial number uniquely assigned to the MFP 300.

In S605, the firmware management server 200 authenticates the serial number notified from the MFP 300 and transmits an applicable firmware list to the MFP 300.

Figure 8C:
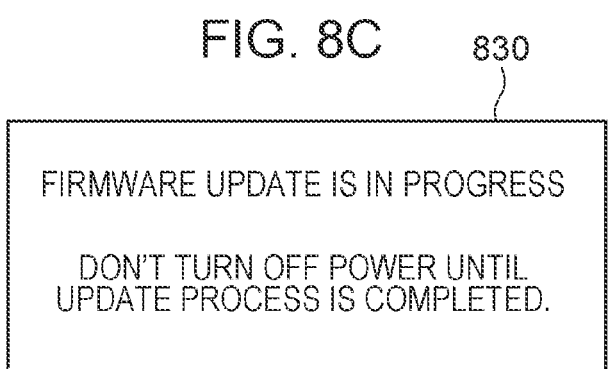
FIG. 8C is a diagram showing a screen displayed in the middle of firmware update processing on the image forming apparatus.

In S606, the MFP 300 finds a new version of firmware from the acquired firmware list and determines to update the firmware to it. In this situation, a screen 830 is displayed as illustrated in FIG. 8C.

In S607, the MFP 300 acquires new firmware using a corresponding URI (Uniform Resource Identifier). In this step, ⅓ of the total amount of data that can be held at one time in the RAM 303 (details will be described later) which serves as a temporary storage area is downloaded.

In S608, the MFP 300 deletes ⅓ of the firmware currently held in the eMMC (302) which serves as a long-term storage area.

In S609, the MFP 300 writes the firmware to the area vacated by the deletion in the RAM 303.

Similarly, the MFP 300 executes downloading in S610, erasing data in S611, and writing data in S612. Furthermore, the MFP 300 executes downloading in S613, erasing data in S614, and writing data in S615. Although it is assumed in the above example that the firmware is divided into three parts and downloaded part by part, the number of divisions may be any other number. In the present embodiment, the download is performed by an HTTP GET operation, FTP, or the like.

Figure 7:
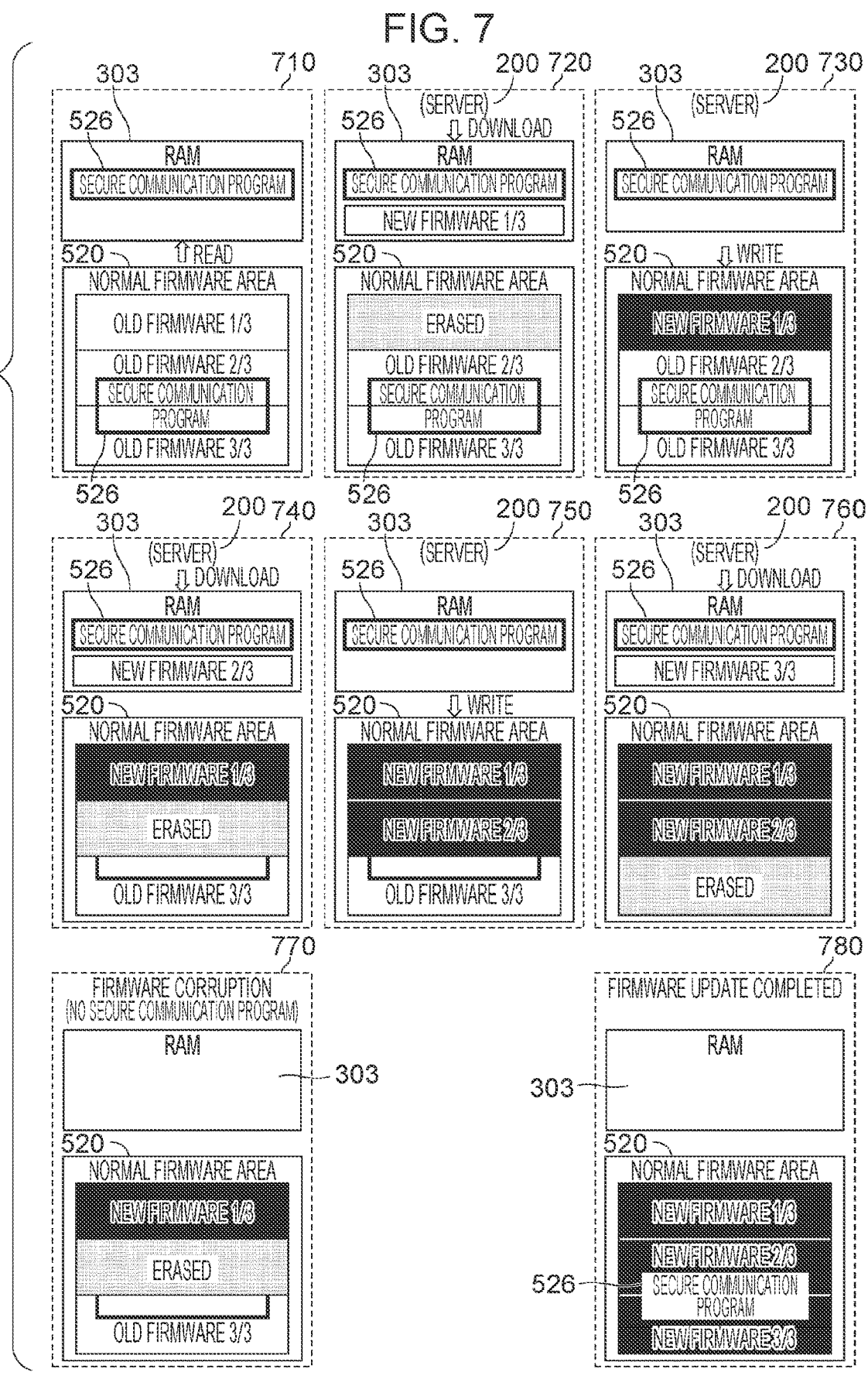
FIG. 7 is a diagram showing transitions of data storage status at various stages of a firmware update.

In S616, the MFP 300 performs restart processing to start the updated firmware. Note that if power of the MFP 300 is turned off at timing 620 (in the middle of the processing in step S612 in FIG. 6) or the like, the communication program capable of encrypted communication will not remain anywhere in the MFP 300, and thus it will become impossible to update the firmware (that is, the malfunctioning state occurs). The transition of the data holding state is described below with reference to FIG. 7. FIG. 7 is a diagram illustrating the transitions of the data holding state at various stages of the firmware update.

A state 710 indicates the data holding state of the MFP 300 at a time in S606. In this state, a secure communication control program 526 (details of which will be described later) is loaded in the RAM 303 such that the firmware can be downloaded.

A state 720 indicates the data holding state of the MFP 300 at a time in S608.

A state 730 indicates the data holding state of the MFP 300 at a time in S609. In this state, the secure communication control program 526 remains in the normal firmware area 520. Therefore, even if the power of the MFP 300 is turned off, the MFP 300 can recover by itself.

A state 740 indicates the data holding state of the MFP 300 at a time in S611. In this stage, the secure communication control program 526 is lost from the normal firmware area 520. Therefore, when the power of the MFP 300 is turned off, it will become impossible for the MFP 300 to recover by itself. Therefore, in the firmware update management area 540 (details thereof will be described later) of the normal firmware, an "update-in-progress" flag is set to indicate that the normal firmware is currently being written. This flag is reset when the firmware update is completed.

Therefore, when the power of the MFP 300 is turned on, the flag is checked, and if the flag indicates that update is in progress, it can be determined that the MFP 300 is in a malfunctioning state.

A state 750 indicates the data holding state of the MFP 300 at a time in S612.

A state 760 indicates the data holding state of the MFP 300 at a time S614.

A state 770 indicates the data holding state of the MFP 300 that occurs after the power of MFP 300 is turned off at timing 620. In this state, neither the RAM 303 nor the eMMC 302 stores the secure communication control program 526.

A state 780 indicates the data holding state of the MFP 300 at a time in S616.

FIGS. 8A to 8C show examples of screens that are processed by normal firmware and displayed on a display of an operation panel 305 of the MFP 300. With reference to these figures, screen operations related to starting the firmware update are described below.

First, when the power of the MFP 300 is turned on, the normal firmware starts to operate and displays a home screen D1 on the operation panel 305. A screen 810 indicates a screen displayed when the MFP 300 is started.

When a user of the MFP 300 selects "firmware update" by operating a key or the like on the operation panel 305, the screen displayed on the operation panel changes to a screen 820.

The screen 820 is for selecting a firmware update method.

When "via Internet" 821 on the screen 820 is selected by operating a key or the like on the operation panel 305, firmware update processing between the firmware management server 200 and the MFP 300 is started.

Figure 9:
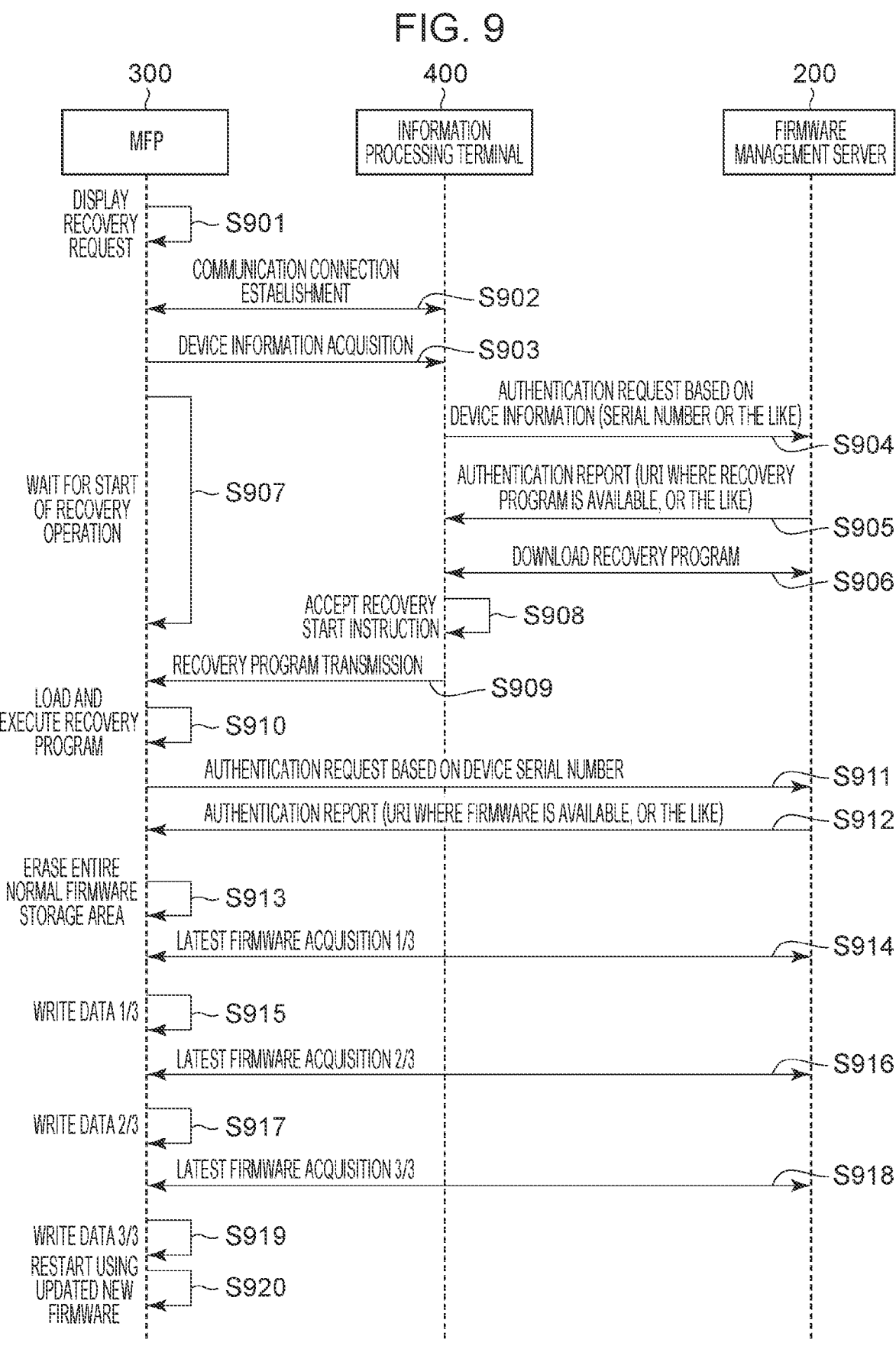
FIG. 9 is a diagram showing a sequence of firmware recovery processing.

FIG. 9 is a diagram showing a sequence of firmware recovery processing. In the state 770 shown in FIG. 7, the MFP 300 cannot recover by itself. Therefore, recovery is accomplished by executing recovery processing with assistance from the user.

In S901, the MFP 300 displays a recovery request.

In S902, the MFP 300 establishes a communication connection with the information processing terminal 400.

In S903, the information processing terminal 400 acquires device information as predetermined information from the MFP 300. The device information includes unique serial information (serial number) and the like in addition to the model information of the MFP 300.

In S904, the information processing terminal 400 requests the firmware management server 200 for authentication using the acquired device information.

In S905, the firmware management server 200 reports the authentication result.

In S906, the information processing terminal 400 downloads the recovery program using the URI included in the authentication result.

In S907, the MFP 300 waits for the start of the recovery job from S904 to S906.

In S908, the information processing terminal 400 determines to start recovery processing.

In S909, the information processing terminal 400 transmits the recovery program to the MFP 300.

In S910, the MFP 300 loads the recovery program in the RAM 303 and executes it.

In S911, the MFP 300 communicates with the firmware management server 200 using the recovery program and requests authentication using the serial number included in the device information.

In S912, the firmware management server 200 transmits the authentication result to the MFP 300.

In S913, the MFP 300 completely erases the normal firmware storage area.

In S914, the MFP 300 downloads the first ⅓ of the latest firmware from the firmware management server.

In S915, the MFP 300 stores the downloaded firmware in the normal firmware storage area.

In S916, the MFP 300 downloads the second ⅓ of the latest firmware from the firmware management server.

In S917, the MFP 300 stores the downloaded firmware in the normal firmware storage area.

In S918, the MFP 300 downloads the third ⅓ of the latest firmware from the firmware management server.

In S919, the MFP 300 stores the downloaded firmware in the normal firmware storage area.

In S920, the MFP 300 performs restart processing to start using the updated new firmware.

Figure 10:
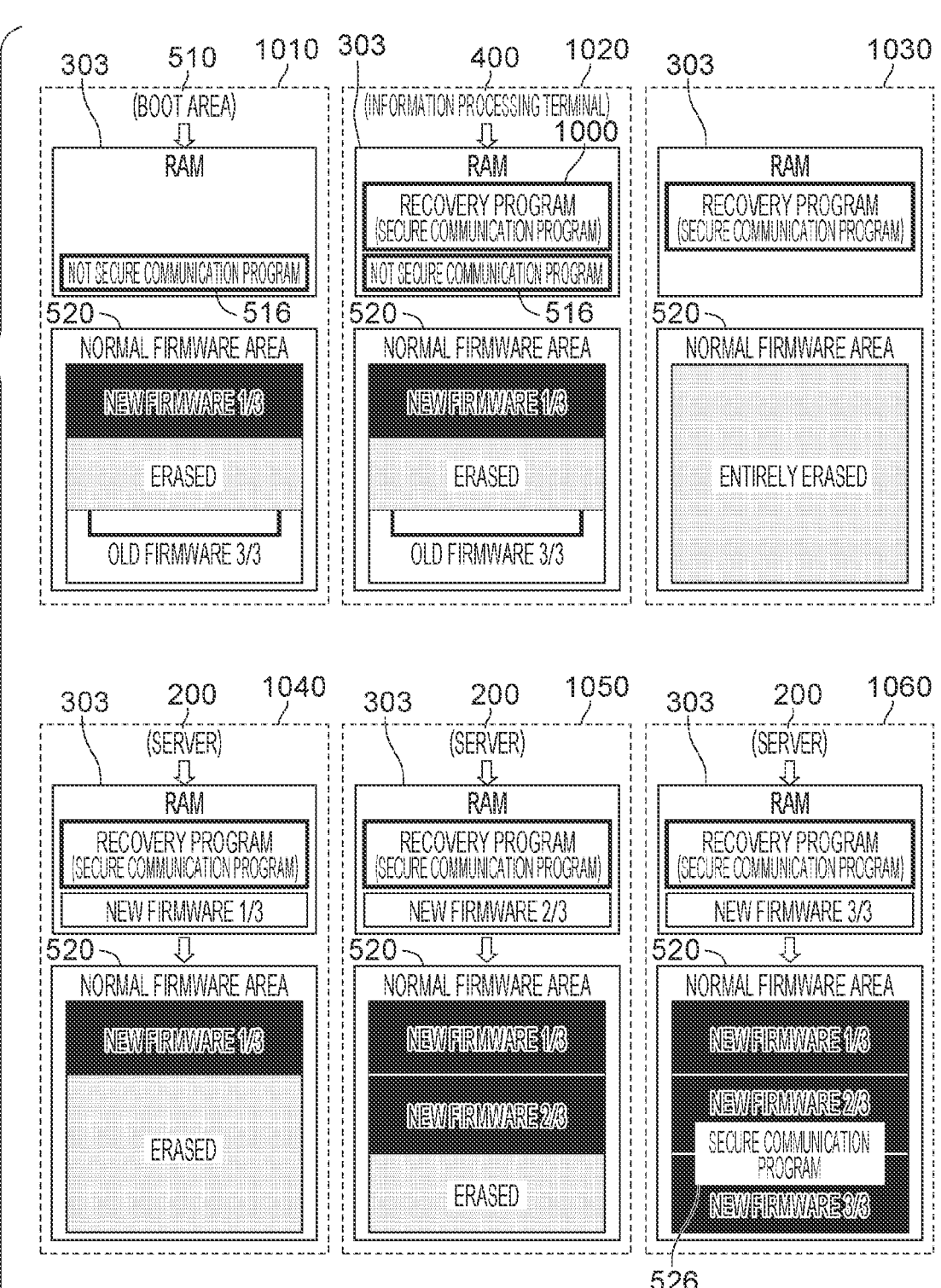
FIG. 10 is a diagram illustrating data storage states at various stages of firmware recovery processing.

Through the above steps, the recovery processing of the MFP 300 is completed. Transitions of the data holding state during the recovery processing are described below with reference to FIG. 10. FIG. 10 is a diagram illustrating data storage states at various stages of the firmware recovery processing.

A state 1010 indicates the data holding state of the MFP 300 at a time in S901. In this state, neither the RAM 303 nor the eMMC 302 stores the secure communication control program 526. A non-secure communication control program 516 has been loaded into the RAM 303 in preparation for issuing a recovery request.

A state 1020 indicates the data holding state of the MFP 300 at a time in S909.

A state 1030 indicates the data holding state of the MFP 300 at a time in S913.

A state 1040 indicates the data holding state of the MFP 300 at a time in S915.

A state 1050 indicates the data holding state of the MFP 300 at a time in S917.

A state 1060 indicates the data holding state of the MFP 300 at a time in S919.

In the present embodiment, the MFP 300 performs the firmware recovery process via the steps described above. Configurations to realize the above steps are described in detail below.

Image Forming Apparatus

Figure 3:
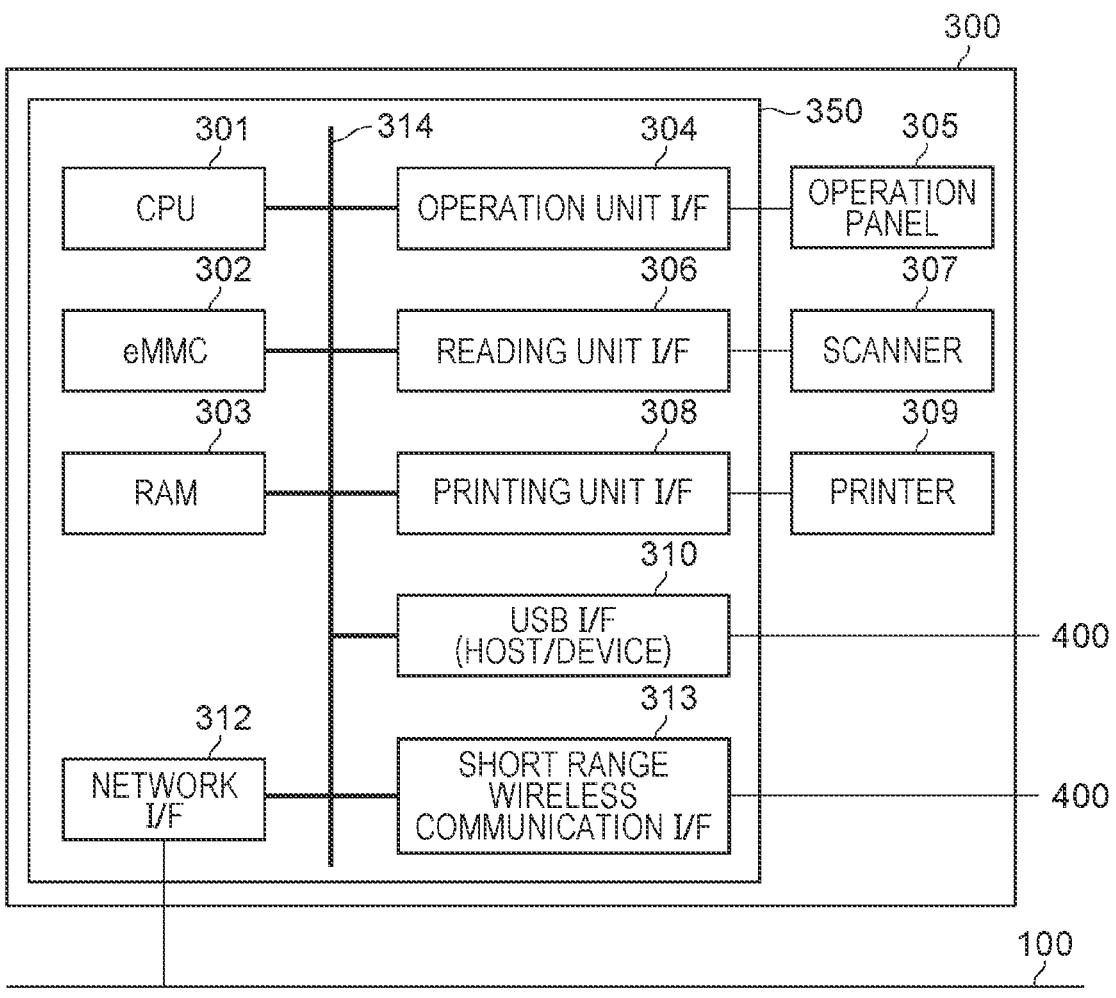
FIG. 3 is a diagram showing a configuration of an image forming apparatus.

FIG. 3 is a diagram illustrating a configuration of an image forming apparatus.

The MFP 300 is an image forming apparatus configured to form an image on a sheet. In the description of the present embodiment, the image forming apparatus is taken as an example. However, the present embodiment can also be applied to an image processing apparatus that performs image processing other than the image formation processing, or an information processing apparatus that performs information processing other than the image processing.

The MFP 300 includes a controller 350, an operation panel 305, a scanner 307, and a printer 309.

The operation panel 305 is a user interface that displays information to the user and accepts an operation from the user. The operation panel 305 includes a display that displays information to the user, a touch panel that detects an input given by the user, and a hard key.

The scanner 307 is an image reading unit that reads an image from a document. The scanner 307 reads an image of a paper document, and the CPU 301 converts the read image into image data such as binary data. The image data generated based on the image read by the scanner 307 is transmitted to an external apparatus or printed on recording paper.

The printer 309 is an image forming unit (a printing unit) that forms an image on a sheet. The printer 309 prints the image based on the transferred image data on recording paper fed from a paper feed cassette.

The controller 350 is a control unit for performing various controls on the MFP 300. The controller 350 includes a CPU 301, an eMMC 302, a RAM 303, an operation unit OF 304, an operation panel 305, a reading unit I/F 306, a printing unit OF 308, a USB OF 310, a network OF 312, and a short-range wireless communication unit OF 313. These components are communicatively connected via a system bus 314.

The CPU 301 is a processor that executes main processing by software among controls performed by the controller 350.

The eMMC 302 is a storage (a storage unit) that stores programs for various controls on the MFP 300 and various data (fonts and image data). The eMMC 302 includes a flash memory and has a storage capacity capable of storing firmware (normal firmware) for controlling the MFP 300, a firmware management program, and the like. The storage capacity of the eMMC 302 is, for example, 16 GB. Although an HDD or an SSD may be used as the storage installed in the MFP 300, it is desirable to use a relatively small-capacity storage from the point of view of the small size of the firmware and the features of the present disclosure.

The RAM 303 is a main memory and is used as a work area for image data and a temporary storage area for loading various control programs from the eMMC 302.

The operation unit OF 304 controls inputting/outputting of information via the operation panel.

The reading unit OF 306 controls inputting/outputting of information to/from the scanner 307.

The printing unit I/F 308 controls inputting/outputting of information to/from the printer 309.

The USB I/F 310 controls communication by a USB host and a USB device. Note that the numbers of USB hosts and USB devices are not limited.

The network I/F 312 is a communication interface for communicating with another apparatus via the network 100. The network I/F 312 enables wireless communication such as Wi-Fi communication (wireless LAN communication) according to a wireless standard (IEEE802.11), and wired communication using an Ethernet cable or the like according to a wired communication standard (IEEE802.3).

The short-range wireless communication I/F 313 is a communication interface for realizing a direct connection in a local environment, such as NFC (Near Field Communication), Bluetooth®, or the like.

The details of the data structure in the eMMC 302 are described below. FIG. 5A is a diagram illustrating the data structure in the eMMC in the image forming apparatus.

As shown in FIG. 5A, the eMMC 302 includes a boot area 510, a normal firmware area 520, a device configuration information area 530, a firmware update management area 540, and a firmware URI storage area 550.

The boot area 510 is an area in which boot data 511 is stored. The boot data 511 includes a program to be read at an initial stage when the power of the MFP 300 is turned on.

The normal firmware area 520 is an area in which normal firmware 521 for realizing main functions of the MFP 300 is stored. The normal firmware area has a storage capacity of, for example, about 10 GB, and serves as a data area in which data having a size equal to or more than half the capacity of the eMMC 302 is stored.

The device configuration information area 530 is an area for storing device configuration information.

The firmware update management area 540 is an area in which a firmware update status flag is stored.

The firmware URI storage area 550 is an area for storing a URI from which the firmware can be downloaded.

Details of the boot data 511 stored in the boot area 510 are described below. FIG. 5B is a diagram illustrating the data structure of the boot storage area.

The boot data 511 includes a boot control program 512, a firmware update control program 513, an application control program 514, a storage control program 515, and a communication control program 516.

The boot control program 512 is a part that is started first by the CPU 301 when the power of the MFP 300 is turned on. The boot control program 512 performs processing for activating the boot data 511, other programs, and the normal firmware 521 depending on the situation.

The firmware update control program 513 is a program that performs processing related to the firmware update. At least a part of the recovery program processing (FIG. 14) and the firmware update processing (FIG. 15), which will be described later, is executed by the update control program 513.

The application control program 514 exchanges information with an application executed by the information processing terminal 400 when communicating with the information processing terminal 400.

The storage control program 515 is a program used when the MFP 300 is recovered using a recovery medium (such as a USB memory).

The communication control program 516 is a program for controlling communication. The communication control program 516 holds programs for communication via Wi-Fi, USB, NFC, and Bluetooth® depending on the configuration of the MFP 300. Note that the communication control program 516 does not include data for encrypted communication due to a storage capacity limitation.

Therefore, the communication control program 516 is used for non-secure communication and local communication.

Details of the normal firmware 521 stored in the normal firmware area 520 are described below. FIG. 5C is a diagram showing a data structure of an area in which normal firmware can be stored.

The normal firmware 521 includes a UI control module 522, a firmware update control module 523, a job control module 524 and a device control module 525.

The UI control module 522 has information necessary for the user I/F, such as language data, bitmap data, voice guidance data, and the like.

The firmware update control module 523 and the job control module 524 each have a program corresponding to each function provided by the MFP 300. Specific examples of the programs are a facsimile job control program, a copy job control program, a scan job control program, and a print job control program.

The device control module 525 includes programs for controlling various components of the MFP 300. Specific examples of the programs are a facsimile engine control program, a scan engine control program, a print engine control program, and the like. The device control module 525 also includes a communication control program 526. It is assumed that the communication control program 526 includes data and the like for encrypted communication. Therefore, the communication control program 526 is used for general communication such as communication via the Internet.

In the present embodiment, the UI control module, the job control module, and the device control module are included in one piece of firmware for simplicity of the explanation, but they may be divided into separate pieces of firmware.

Firmware Management Server

Figure 2:
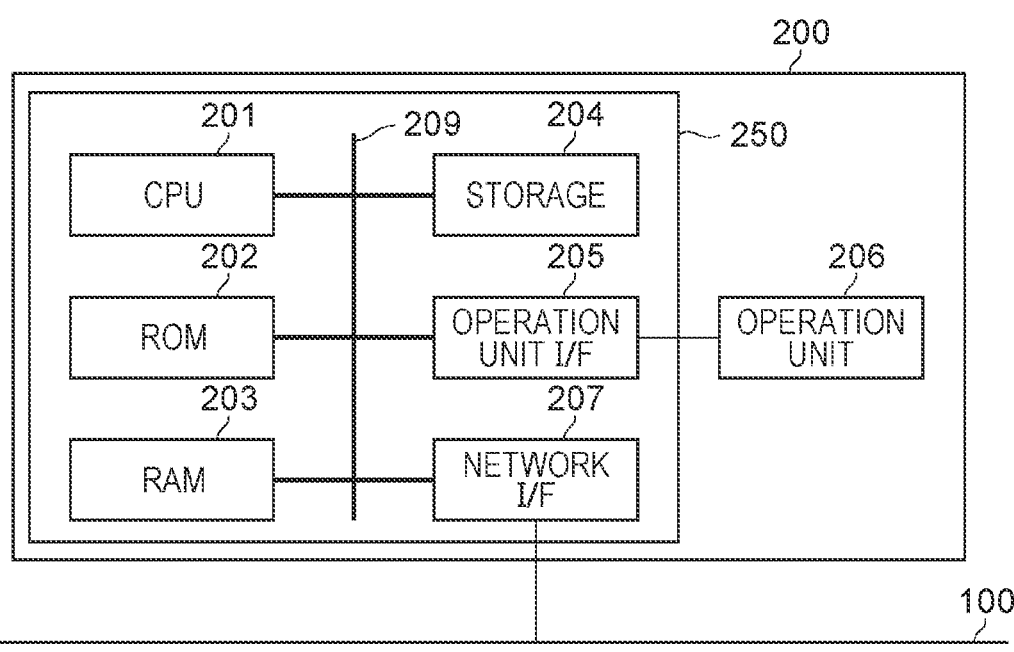
FIG. 2 is a diagram showing a configuration of a firmware management server.

FIG. 2 is a diagram illustrating a configuration of the firmware management server.

The firmware management server 200 includes a controller 250 and an operation unit 206.

The operation unit 206 is a user interface that displays information to the user and accepts an operation from the user. The operation unit 206 includes a display that displays information to the user, a touch panel that detects an input from the user, and a hard key. More specifically, for example, the operation unit 206 performs displaying information to a server administrator, various setting/inputting operations from the server administrator, and the like.

The controller 250 is a control unit for performing various controls in the firmware management server 200.

The controller 250 includes a CPU 201, a ROM 202, a RAM 203, a storage 204, an operation unit OF 205, and a network OF 207. These components are communicatively connected via a bus 209.

The CPU 201 reads control programs stored in the ROM 202 and executes various processes for controlling the operation of the firmware management server 200.

The ROM 202 stores programs for controlling the firmware management server 200 and various control programs for firmware management.

The RAM 203 is used as a main memory of the CPU 201 and as a temporary storage area such as a work area.

The storage 204 stores configuration information of the firmware management server 200, firmware that operates on the MFP 300, and the like. The storage 204 also stores applications (including a dedicated recovery driver, and various drivers for controlling printers and scanners) that run on the information processing terminal 400.

The operation unit OF 205 is an interface for controlling the operation unit 206.

The network OF 207 is an interface for performing data communication with an external apparatus via the network 100.

Figure 18:
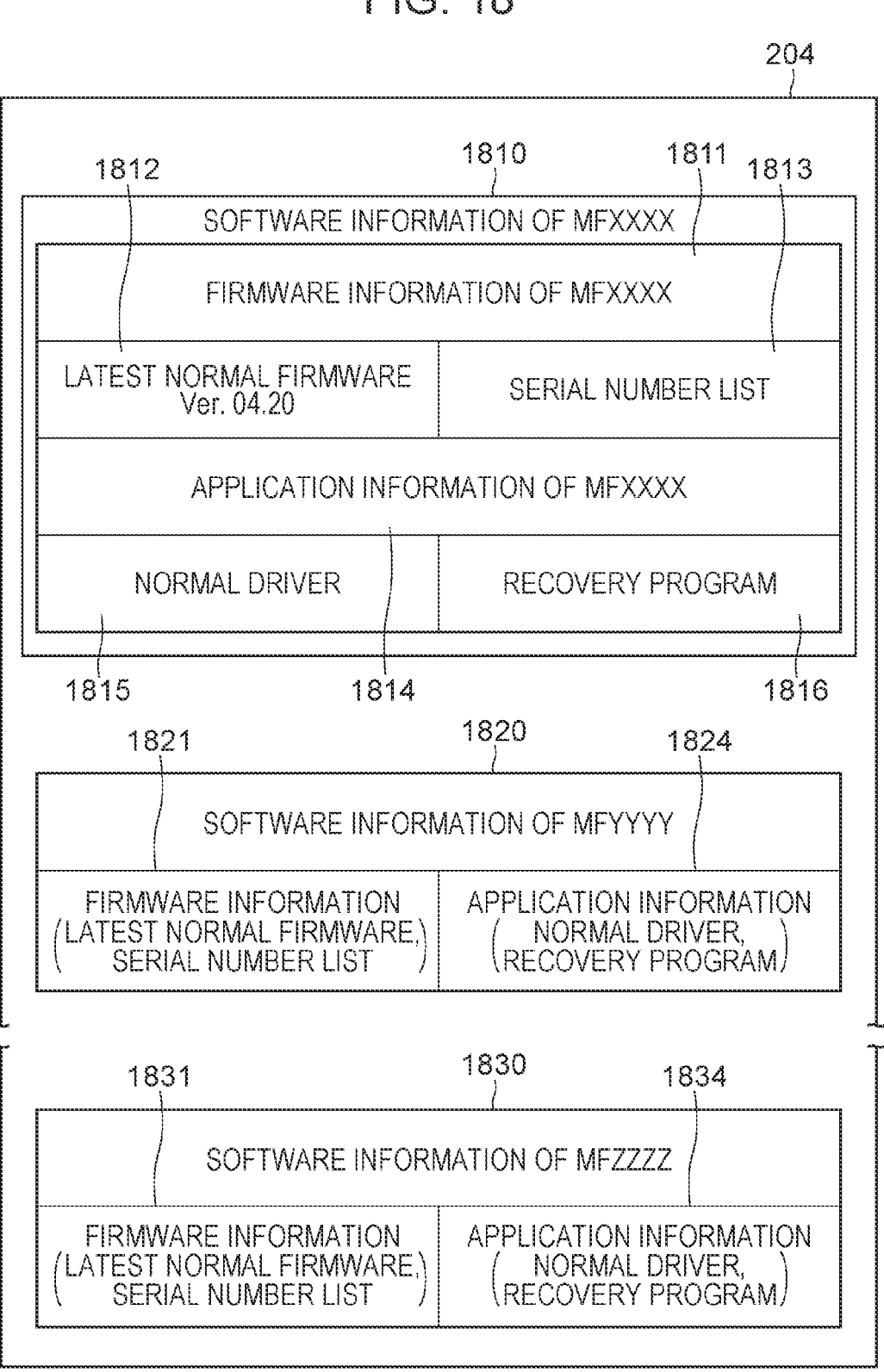
FIG. 18 is a diagram showing data stored by a firmware management server.

The data structure in the storage 204 in the firmware management server 200 is described below. FIG. 18 is a diagram illustrating data held by the firmware management server.

The storage 204 is configured for respective software groups corresponding to models and includes software information on MFXXXX 1810, software information on MFYYYY 1820, software information on MFOOOO 1830, and the like.

Each piece of software information includes firmware information (1811, 1821, 1831) and application information (1814, 1824, 1834).

The MFXXXX software information 1810 includes MFXXXX firmware information 1811 and MFXXXX application information 1814. The MFXXXXX firmware information 1811 includes latest normal firmware 1812 and a serial number list 1813. In the present embodiment, it is assumed that the latest version of firmware is stored, but a plurality of versions of firmware may be stored.

It is assumed that the serial number list 1813 indicates serial numbers that the MFXXX can have. However, the serial number list 1813 may include not only such serial numbers but also various other model-specific information.

The MFXXXX application information 1814 includes a normal driver 1815 for controlling functions such as functions of a scanner, a printer, and a facsimile of MFXXXX. The MFXXXX application information 1814 also includes a recovery program 1816 that is used, when MFXXXX is in a malfunctioning state, to restore it to a normal state.

Information Processing Terminal

Figure 4:
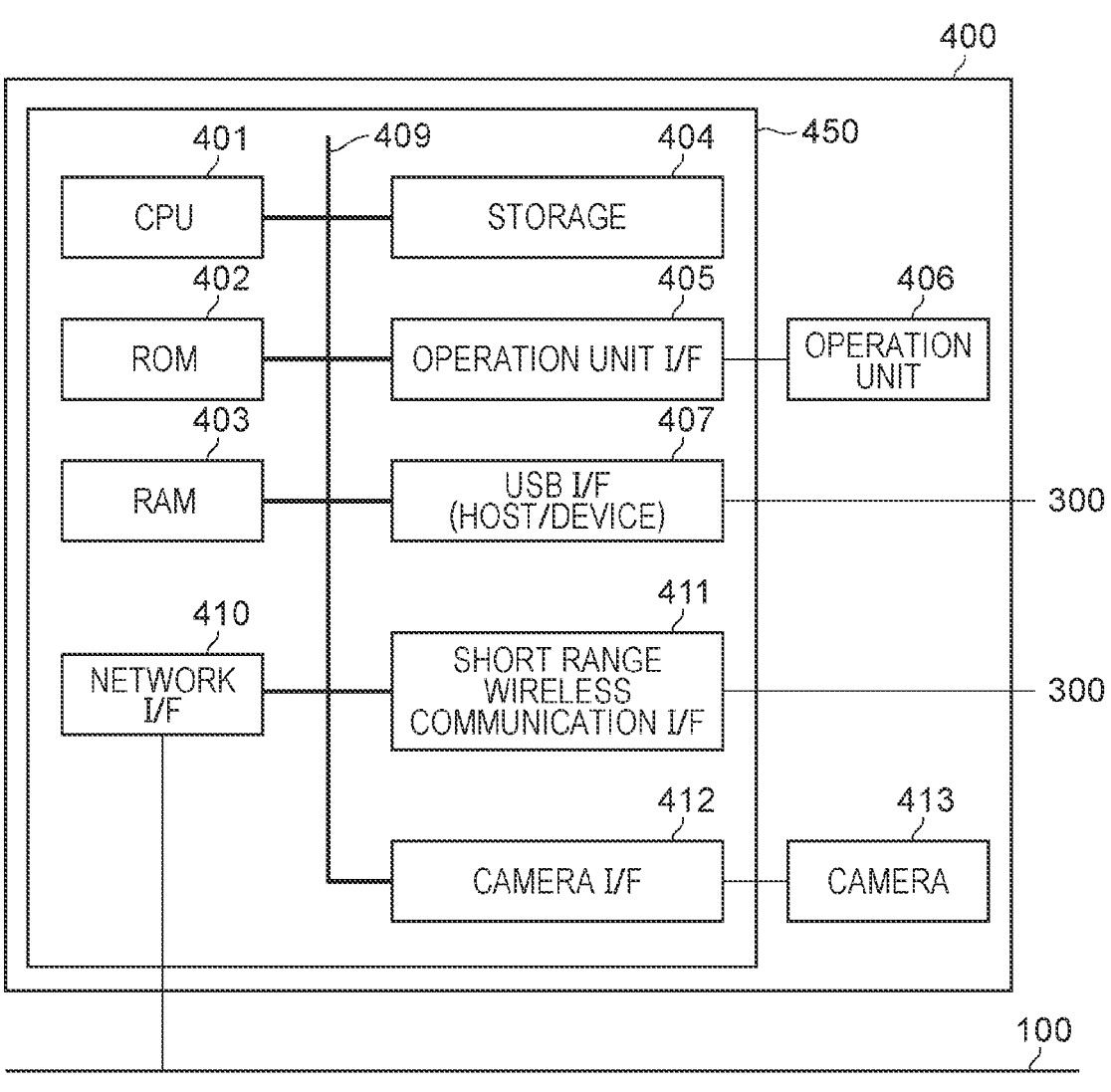
FIG. 4 is a diagram showing a configuration of an information processing terminal.

FIG. 4 is a diagram illustrating a configuration of the information processing terminal. The information processing terminal 400 is a device capable of communicating with the MFP 300. Examples of the information processing terminal 400 include a mobile terminal such as a smartphone and a tablet device, as well as a PC (Personal Computer).

The information processing terminal 400 includes a controller 450, an operation unit 406 and a camera 413.

The operation unit 406 is a user interface that displays information to the user and accepts input of information from the user. The operation unit 406 includes a display that displays information, a touch panel that accepts a user operation, and a hard key.

The camera 413 is an imaging unit capable of capturing an image. The camera 413 captures a still image, a moving image, or the like, and reads a QR code (registered trademark) or the like according to the present disclosure.

The controller 450 is a control unit that performs various controls in the information processing terminal 400.

The CPU 401 reads control programs stored in the ROM 402 and executes various processes such as acquisition of firmware that operates on the MFP 300 from the firmware management server 200.

The ROM 402 stores a program for controlling the firmware management server 200 and various control programs for firmware management.

The RAM 203 is used as a main memory of the CPU 201 and as a temporary storage area such as a work area.

The storage 404 stores configuration information of the firmware management server 200, update firmware for a plurality of models, and the like. The storage 404 also stores images captured by the camera 413 and/or the like.

The operation unit I/F 405 is an interface that controls input/output via the operation unit 406.

The USB I/F 407 is an interface that controls wired communication (USB communication) by a USB host and a USB device. There may be a plurality of USB hosts and USB devices.

The network I/F 410 is an interface for communicating with an external apparatus via the network 100. For example, the network I/F 410 transmits and receives image data and print data to and from the MFP 300.

The short-range wireless communication I/F 411 is a communication interface for realizing direct connection in a local environment, such as NFC (Near Field Communication) and Bluetooth®.

The camera I/F 412 is an interface that accepts input of data captured by the camera 413.

Control of Image Forming Apparatus

The details of the control of the MFP 300 are described below.

Figure 13:
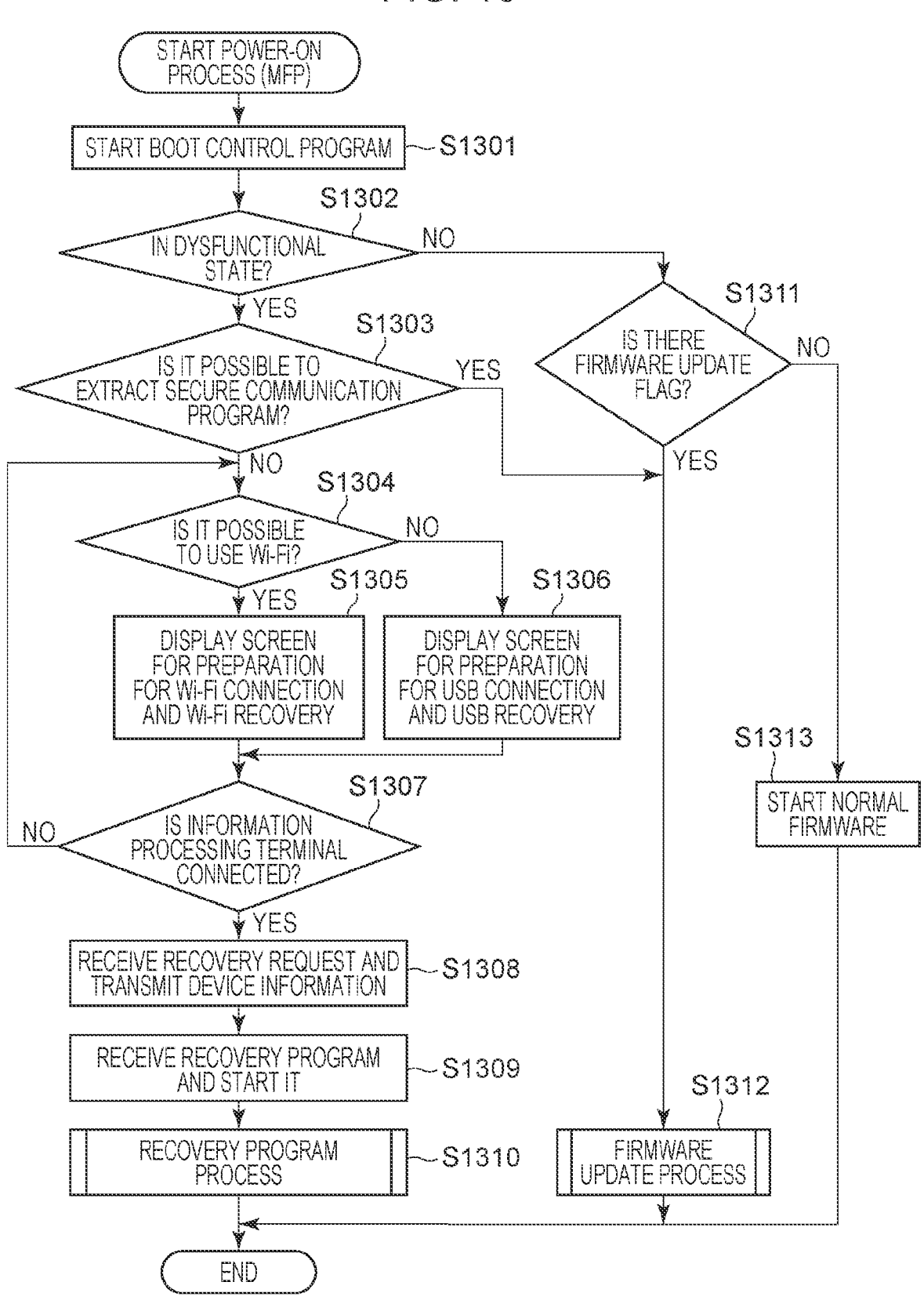

FIG. 13 is a flowchart illustrating a processing flow performed in the image forming apparatus when the power of the image forming apparatus is turned on. This flowchart is implemented by the controller 350 (especially the CPU 301) executing one or more programs.

When the MFP 300 is turned on, supplying of power to the controller 350 is started.

In S1301, the CPU 301 starts the boot control program 512.

In S1302, the CPU 301 executes the boot control program 512 and accesses the firmware update management area 540 to check the update status of the normal firmware and to check whether or not the firmware is in a malfunctioning state. In a case where the CPU 301 determines that the firmware is in a malfunctioning state (YES), the process proceeds to S1303. In a case where the CPU 301 determines that the firmware is not in a malfunctioning state (NO), the process proceeds to S1311. More specifically, in a case where the "update-in-progress" flag is set in the firmware update management area 540, it is determined that the firmware is in a malfunctioning state. In a case where the "update-in-progress" flag is not set in the firmware update management area 540, it is determined that the firmware is not in a malfunctioning state.

In S1303, the CPU 301 determines whether or not it is possible to extract the communication control program 526 from the malfunctioning normal firmware area 520. In a case where the CPU 301 determines that the extraction is possible (YES), the process proceeds to S1304, but in a case where it is determined that the extraction is impossible (NO), the process proceeds to S1312.

In S1304, the CPU 301 confirms whether or not Wi-Fi communication can be used for recovery, that is, whether or not Wi-Fi communication is configured to be available.

In a case where the CPU 301 determines that Wi-Fi communication can be used (YES), the process proceeds to S1305, but in a case where it is determined that Wi-Fi communication cannot be used (NO), the process proceeds to S1306. In the following description of the present embodiment, it is assumed that the MFP 300 can use at least USB communication.

Figure 11A:
FIG. 11A is a diagram showing an example of a screen displayed in recovery request processing.

In S1305, the CPU 301 executes the communication control program 516 and activates a software AP mode or a direct connection mode. Thereafter, information for wireless LAN communication with the MFP 300 is displayed on the operation panel 305. FIG. 11A is a diagram illustrating an example of a screen in recovery request processing. A screen 1101 displays information for wirelessly connecting to the MFP 300. On the screen 1101, SSID and PASS (KEY), or a QR code for acquiring them, and a short-range wireless icon are displayed. The KEY is an encryption key required for the wireless connection. Examples of KEY are a password, PSK-AES, a WEP key, a security key, and the like.

SSID and PASS may be obtained by decoding the QR code, or may be obtained by receiving them via short-range wireless communication. The information displayed on the screen 1101 may be changed depending on the configuration of the MFP 300. For example, the QR code and the short-range wireless icon may be switched between displayed/ hidden states.

Figure 11B:
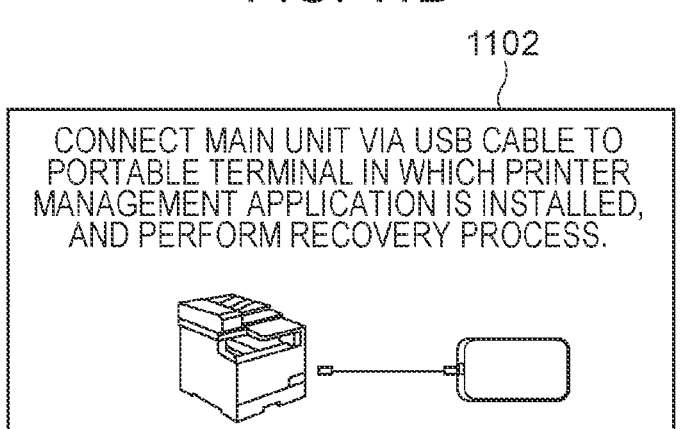
FIG. 11B is a diagram showing an example of a screen displayed in recovery request processing.

In S1306, the CPU 301 executes the communication control program 516 and prepares for USB connection. The operation panel 305 then displays information to prompt to establish a wired connection to the MFP 300. FIG. 11B is a diagram illustrating an example of a screen in recovery request processing. A screen 1102 displays a message prompting for USB connection.

In response to the display of screen 1101 or screen 1102, the user performs a procedure on an application of the information processing terminal 400 to establish a connection. FIG. 12 is a diagram illustrating screen transitions on a terminal in the recovery processing. A screen 1210 is a menu screen provided by the printer management application. A firmware update button 1211 and a recovery button 1212 are displayed on the screen 1210. In the present example, it is assumed that the recovery button 1212 is selected, and the screen transitions to a screen 1220. A Wi-Fi button 1221 and a USB button 1222 are displayed on the screen 1220. The user selects the Wi-Fi button 1221 in S1305 or the USB button 1222 in S1306. When the Wi-Fi button 1221 is selected, the screen transitions to a screen 1230. On the screen 1230, an acquisition button 1231, an acquisition button 1232, an SSID input field 1233, and a PASS input field 1234 are displayed. In a case where the user selects the acquisition button 1231, the information processing terminal 400 is connected to the MFP 300 and SSID and PASS are acquired via the short-range wireless communication OF 313 and the short-range wireless communication I/F 411. In a case where the user selects the acquisition button 1232 and reads the QR code displayed on the MFP 300 with the camera 413, SSID and PASS are acquired. When either one of the above two acquisition methods is executed or manual input is performed, the SSID input field 1233 and the PASS input field 1234 are filled. After completing the input, the user selects the NEXT button 1235.

When the USB button 1222 is selected, a message screen (not shown) prompting for a USB connection is displayed. According to the displayed guidance, the user connects the MFP 300 and the information processing terminal 400 via a USB cable.

After that, in S1307, the CPU 301 confirms whether or not the information processing terminal 400 is connected by any method. In a case where the CPU 301 determines that the connection is not established (NO), the process proceeds to S1304. In a case where the CPU 301 determines that the connection is established (YES), the process proceeds to S1308.

In S1308, the CPU 301 receives a recovery request from the information processing terminal 400. In response, the CPU 301 transmits the device information of the MFP 300 to the information processing terminal 400. When the information processing terminal 400 receives the device information, the display transitions to a screen 1240. The screen 1240 is a screen for the user to allow the reception of data for recovery.

The screen 1240 has a start button 1241. When the start button 1241 is selected, the information processing terminal

400 receives the recovery program from the firmware management server. When the reception is completed, the screen transitions to a screen 1250. The screen 1250 indicates that the data for recovery has been received. The screen 1250 includes a next button 1251. When the next button 1251 is selected, the screen transitions to a screen 1260. The screen 1260 displays information for confirming the communication method for recovery processing. The screen 1260 has a start button 1261. When the start button 1261 is selected, the information processing terminal 400 transmits the received recovery program to the MFP 300.

In S1309, the CPU 301 receives the recovery program from the information processing terminal 400, loads it in the RAM 303, and starts it.

In S1310, the CPU 301 executes recovery program processing. Details of the recovery program processing will be described later.

In S1311, the CPU 301 determines whether or not the firmware update flag is set.

The firmware update flag is a flag that is set when a firmware update instruction is issued during a normal firmware activation. If the firmware update flag is set (YES), the CPU 301 advances the process to S1312. However, if the firmware update flag is not set (NO), the process proceeds to S1313.

In S1312, the CPU 301 executes the firmware update processing. Details of the firmware update process will be described later.

In S1312, the CPU 301 activates the normal firmware and starts a normal operation.

Recovery Program Processing

The recovery program processing in S1310 is described in detail below.

Figure 14:
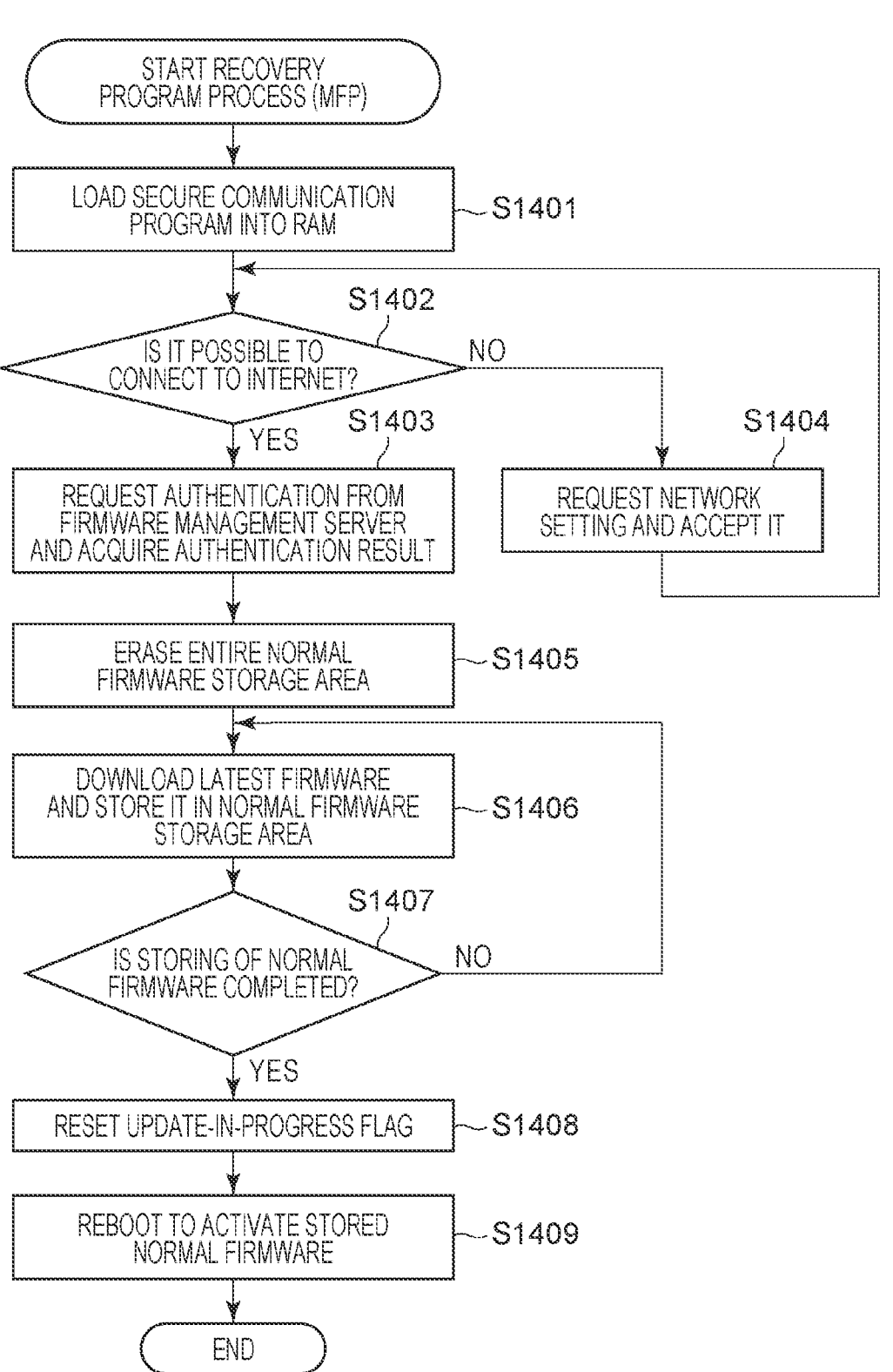
FIG. 14 is a flowchart showing processing executed by a recovery program.

FIG. 14 is a flowchart illustrating processing executed by the recovery program. This flowchart is implemented by the controller 350 (especially the CPU 301) executing one or more programs.

In S1401, the CPU 301 loads the communication control program 526 into the RAM 303 and executes it.

In S1402, the CPU 301 determines whether an Internet connection is possible.

In S1403, the CPU 301 requests authentication from the firmware management server 200 and acquires the authentication result. In the following description, it is assumed that the authentication is successful.

In S1404, the CPU 301 controls the operation panel 305 to request the user to input network settings. Here, it is assumed that an input has been made.

In S1405, the CPU 301 completely erases the normal firmware area 520.

In S1406, the CPU 301 starts downloading the latest firmware and storing it in the normal firmware area 520. In S1407, the CPU 301 determines whether or not the latest firmware has been stored. If it is determined that the storing of the latest firmware is not completed (NO), the CPU 301 continues the processing in S1406 until the storing of the latest firmware storage is completed. If the storing of the latest firmware storage is completed (YES), the process proceeds to S1408.

In S1408, the CPU 301 deletes the "update-in-progress" flag from the firmware update management area 540 (for example, the flag is changed from the "update-in-progress" state to the "update completed" state (=idling state). This indicates that the malfunctioning state has been removed.

In step S1409, the CPU 301 performs reboot processing to reboot the MFP 300 with the normal firmware.

Firmware Update Process

The firmware update processing in S1312 is described in detail below.

Figure 15:
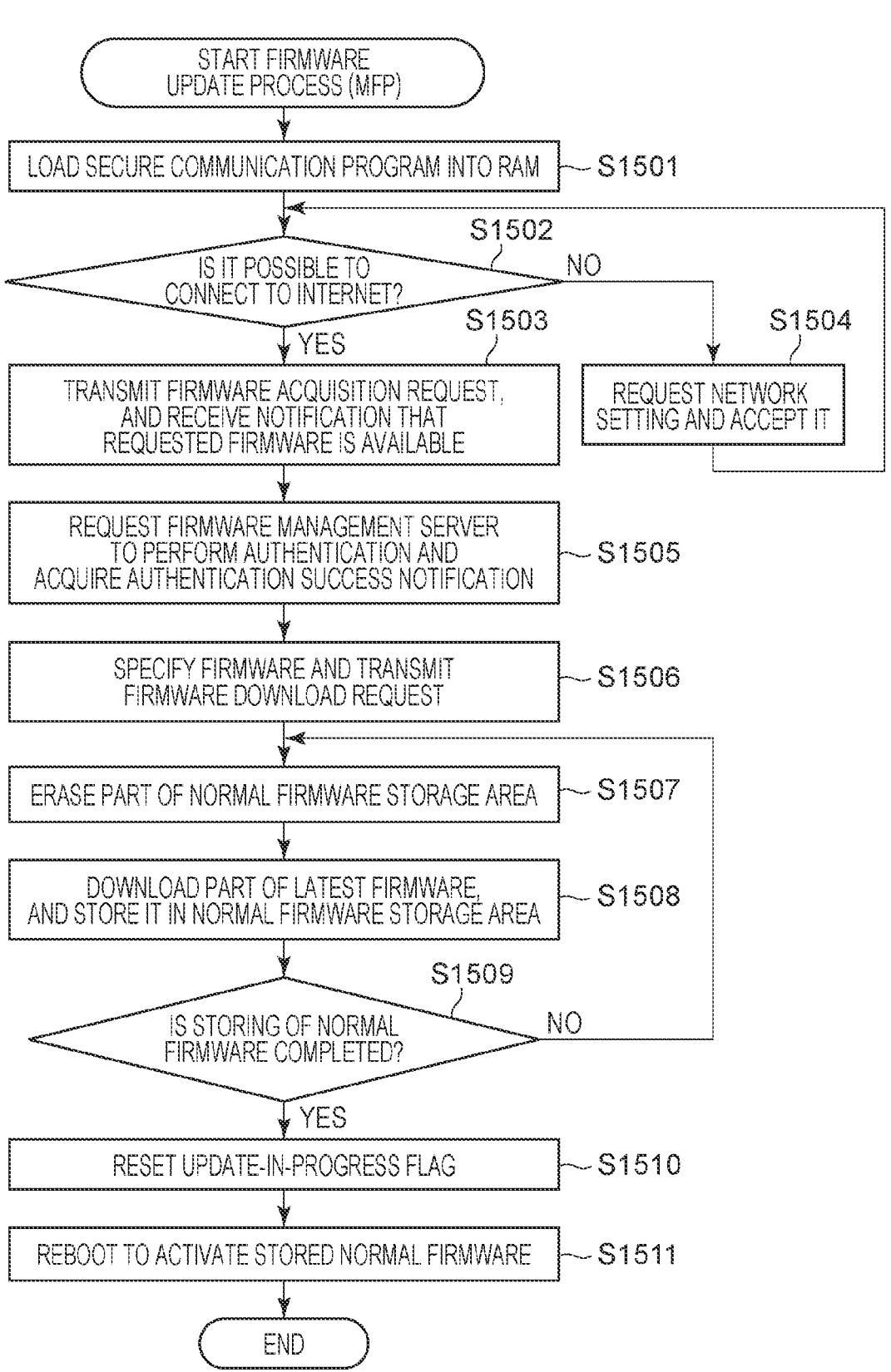
FIG. 15 is a flowchart showing firmware update processing.

FIG. 15 is a flowchart illustrating firmware update processing. This flowchart is implemented by the controller 350 (especially the CPU 301) executing one or more programs.

In S1501, the CPU 301 loads the communication control program 526 into the RAM 303 and executes it.

In S1502, the CPU 301 determines whether an Internet connection is possible.

In S1503, the CPU 301 issues a firmware list acquisition request and receives a notification whether the requested firmware is available or not. Here, it is assumed that the received notification indicates that the requested firmware is available.

In S1504, the CPU 301 controls the operation panel 305 to request the user to input network settings. Here, it is assumed that an input has been made.

In S1505, the CPU 301 requests authentication from the firmware management server 200 and acquires the authentication result. In the following description, it is assumed that the authentication is successful.

In S1506, the CPU 301 specifies the firmware to be downloaded and requests the start of the download.

In S1507, the CPU 301 deletes data in a part of the normal firmware area 520. In addition, the "update-in-progress" flag is set in the firmware update management area 540.

In S1508, the CPU 301 stores the downloaded data, which is part of the latest firmware, in the normal firmware area 520.

In S1509, the CPU 301 determines whether or not the latest firmware has been completely stored. If it is determined that the storing of the latest firmware is not completed (NO), the CPU 301 continues the processing in S1507 and S1508 until the storing of the latest firmware storage is completed. If the storing of the latest firmware storage is completed (YES), the process proceeds to S1510.

In S1510, the CPU 301 deletes the "update-in-progress" flag from the firmware update management area 540 (for example, the flag is changed from the "update-in-progress" state to the "update completed" state (=idling state).

Figure 16:
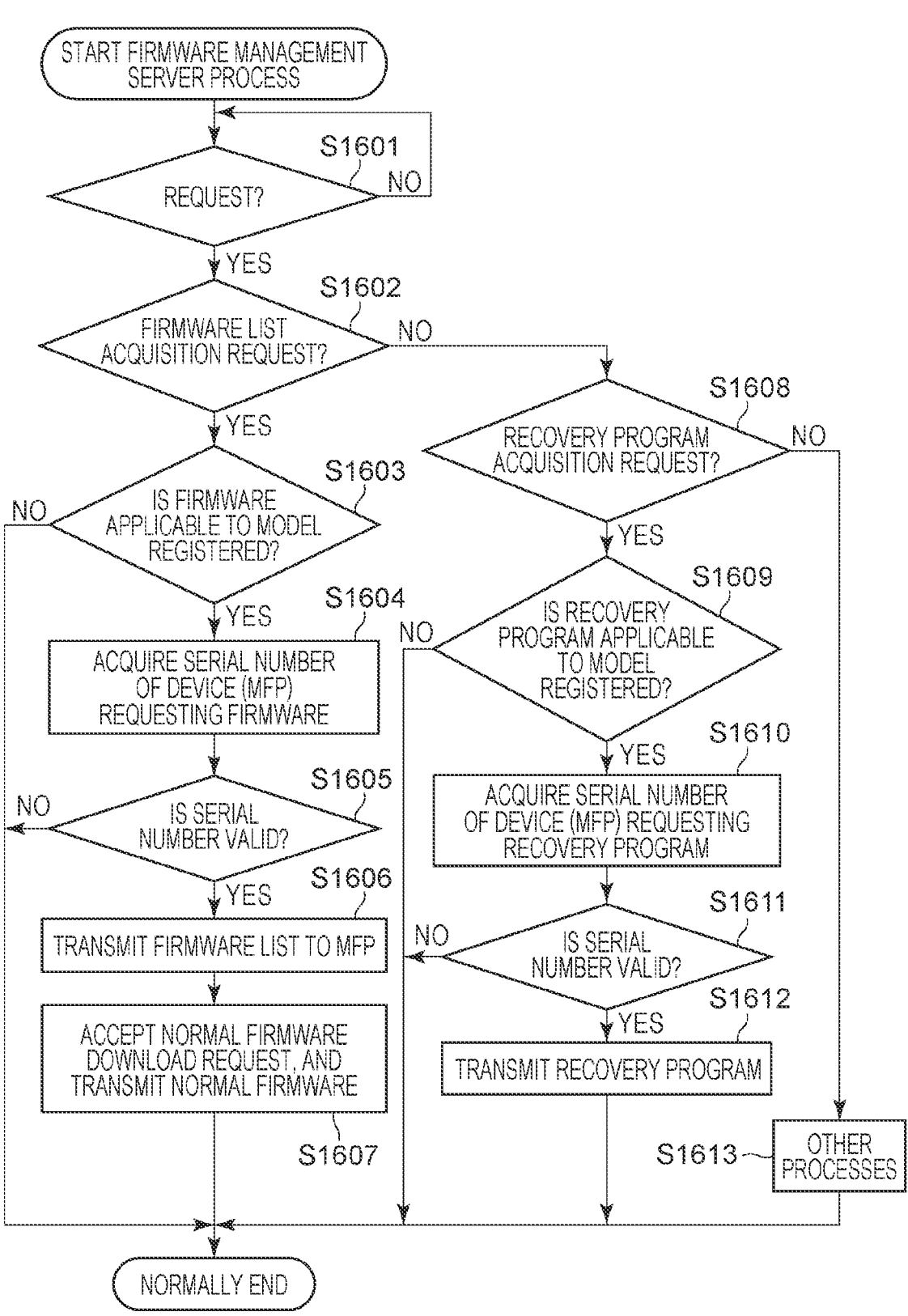
FIG. 16 is a flowchart showing processing executed by a firmware management server.

In step S1511, the CPU 301 performs reboot processing to reboot the MFP 300 with the normal firmware.
Firmware Management Server Processing Details of the control of the firmware management server 200 are described below. FIG. 16 is a flowchart illustrating processing executed by the firmware management server. FIG. 17 is a diagram illustrating a structure of communication data.

This flowchart is implemented by the controller 250 (especially the CPU 201) executing one or more programs.

In S1601, the CPU 201 waits (if NO) until a request is received. When the request is received (YES), the process proceeds to S1602.

In S1602, the CPU 201 determines whether the acquired request is a firmware list acquisition request (corresponding to S1503). In a case where the CPU 201 determines that it is a firmware list acquisition request (YES), the process proceeds to S1603, but in a case where it is determined that it is not a firmware list acquisition request (NO), the process proceeds to S1608. In the firmware list acquisition request, for example, information such as information 1710 in FIG. 17 is exchanged.

In step S1603, the CPU 201 confirms whether or not normal firmware applicable to the model of the MFP 300 is registered in the storage 204. In a case where applicable normal firmware is registered (YES), the CPU 201 advances the process to S1604, but in a case where applicable normal firmware is not registered (NO), the process is ended.

In S1604, the CPU 201 notifies the MFP 300 of the result of the confirmation of the firmware list, and then acquires the serial number from the MFP 300.

In S1605, the CPU 201 confirms whether the obtained serial number is included in the serial number list 1813. In a case where the serial number of the MFP 300 is included in the serial number list 1813 (YES), the process proceeds to S1606, but in a case where the serial number of the MFP 300 is not included in the serial number list 1813 (NO), the process is ended. Information such as information 1720 is exchanged in the authentication request based on the serial number.

In S1606, the CPU 201 transmits the firmware list to the MFP 300 as an authentication report. In the authentication report, information such as information 1730 is exchanged. The information 1730 includes, for example, firmware URI information 1731 and recovery program URI information 1732.

After that, in S1607, a normal firmware download request from the MFP 300 is accepted, and a normal firmware transmission process is started.

On the other hand, in S1608, it is determined whether or not the acquired request is a recovery program acquisition request. In a case where the acquisition request is for the recovery program (YES), the CPU 201 advances the process to S1609, but in a case where the acquisition request is not for the recovery program (NO), the process proceeds to S1613.

In S1613, other processes are performed. Examples of the other processes include a distribution of a normal driver, a distribution of a cooperative application, or the like.

In step S1609, based on the device information of the MFP 300 acquired together with the acquisition request, the CPU 201 determines whether or not the recovery program for the corresponding model is registered. In a case where the recovery program applicable to the model of interest is registered (YES), the CPU 201 advances the process to S1610, but in a case where the recovery program applicable to the model of interest is not registered (NO), the CPU 201 ends the process.

In S1610, the CPU 201 acquires the serial number of the MFP 300 via the information processing terminal 400.

In S1611, the CPU 201 confirms whether the acquired serial number is included in the serial number list 1813. In a case where the serial number of the MFP 300 is included in the serial number list 1813 (YES), the process proceeds to S1612, but in a case where the serial number of the MFP 300 is not included in the serial number list 1813 (NO), the process is ended.

In S1612, the CPU 201 transmits the recovery program to the information processing terminal 400, and ends the process.

In the present embodiment, it is assumed that the download process is performed by the GET operation of HTTP or FTP, but other methods may be used.

The present disclosure can be applied to a system including a plurality of devices or to an apparatus including one device. For example, a part of the software module may be configured to be executed by an external server, and the result of the process performed by the external server may be acquired thereby achieving the functions.

Figure 19:
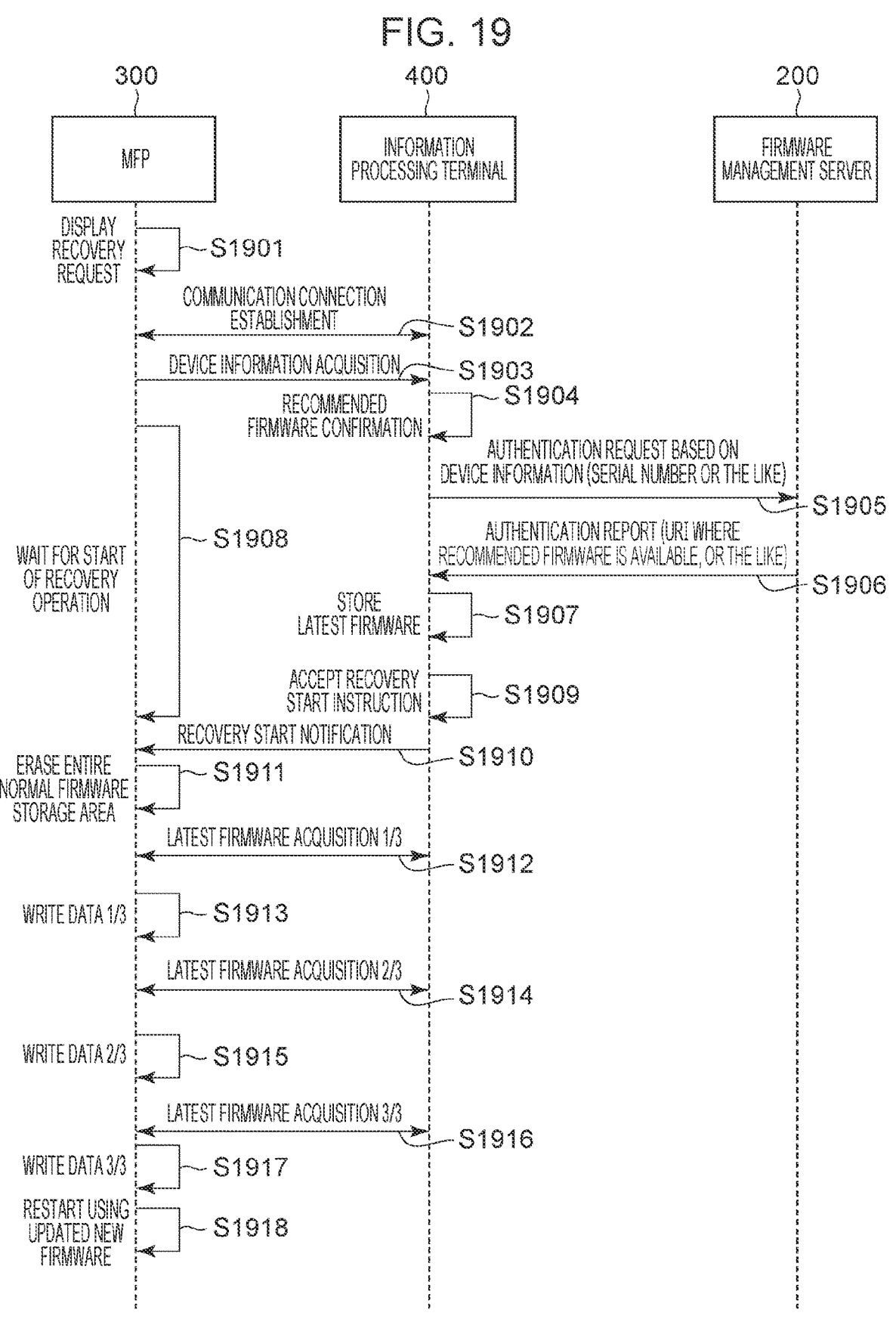
FIG. 19 is a diagram showing another embodiment.

In the embodiments described above, as for the recovery program, a compact recovery program including a secure communication program is transferred to the MFP 300 via the information processing terminal 400, but this is by way of example and not limitation. For example, as shown in FIG. 19, the recovery program including the main part of the firmware may be transferred to the MFP 300 via the information processing terminal 400. FIG. 19 is a diagram showing another embodiment.

In S1901, the MFP 300 displays a recovery request. In S1902, the MFP 300 establishes a communication connection with the information processing terminal 400. In S1903, the information processing terminal 400 acquires device information from the MFP 300. In S1904, the information processing terminal 400 confirms the recommended firmware corresponding to the device information. In S1905, the information processing terminal 400 requests the firmware management server 200 for authentication using the acquired device information. In S1906, the firmware management server 200 reports the authentication result. In S1907, the information processing terminal 400 downloads firmware using the URI included in the authentication result. In S1908, the MFP 300 waits for the start of the recovery operation from S1904 to S1907.

In S1909, the information processing terminal 400 accepts a recovery start instruction. In S1910, the information processing terminal 400 sends the recovery start instruction to the MFP 300. In S1911, the MFP 300 completely erases the normal firmware area 520. In S1912, the MFP 300 downloads the first ⅓ of the latest firmware from the information processing terminal 400. In S1913, the MFP 300 stores the downloaded firmware in the normal firmware storage area. In S1914, the MFP 300 downloads the second ⅓ of the latest firmware from the information processing terminal 400. In S1915, the MFP 300 stores the downloaded firmware in the normal firmware storage area. In S1916, the MFP 300 downloads the third ⅓ of the latest firmware from the information processing terminal 400. In S1917, the MFP 300 stores the downloaded firmware in the normal firmware storage area. In S1918, the MFP 300 performs restart processing to activate the updated new firmware.

In the above-described embodiments, the recovery program is transferred by direct communication between the information processing terminal 400 and the MFP 300, but the recovery program may be transferred to the MFP 300 by other methods. For example, the mobile management application executed on the information processing terminal 400 may have a recovery medium generation function. In the recovery medium generation function, a recovery program is written into a medium (a USB memory, an SD card, etc.) connected to the information processing terminal 400. When this medium is connected to the MFP 300, the MFP 300 detects the recovery program from the medium and uses it for the recovery process.

In the above-described embodiments, the mobile management application is assumed to be activated in advance by the user, but the mobile management application may be activated by other methods. For example, when the MFP 300 and the information processing terminal 400 are connected via a USB cable, the MFP 300 may transmit a command to the information processing terminal 400 via the USB cable to activate the mobile management application. As described above, the mobile management application may be activated in the above-described manner during a boot operation (when normal firmware is malfunctioning). The command may be sent to the information processing terminal 400 such that an application different from the mobile management application, such as a normal application (a print cooperation application, a scan cooperation application), is started during a normal startup process (during an operation with normal firmware).

In the above-described embodiments, the transmission of the device information from the MFP 300 to the information processing terminal 400 and the transmission of the recovery program from the information processing terminal 400 to the MFP 300 are realized by wireless LAN communication. However, one or both of the above communications may be realized by NFC or Bluetooth® communication.

The abbreviations used in the description of the embodiments have the following meanings. ASIC stands for Application Specific Integrated Circuit. CPU stands for Central Processing Unit. EMMC stands for Embedded Multimedia Media Card. FTP stands for File Transfer Protocol. GB stands for gigabyte. HDD stands for Hard Disk Drive. HTTP stands for Hyper Text Transfer Protocol. IEEE stands for Institute of Electrical and Electronics Engineers. LAN stands for Local Area Network. MFP stands for Multifunction Function Peripheral. NFC stands for Near field communication. PC stands for Personal Computer. RAM stand for Random-Access Memory. RFC stands for Request for Comments. ROM stands for Read Only Memory. SSD stands for Solid State Drive. SSID stands for Service Set Identifier. UI stands for User Interface. URI is Uniform Resource Identifier. USB stands for Universal Serial Bus.

According to the present embodiment, as described above, it is possible to perform the recovery process in an apparatus that executes firmware stored in a storage with a limited capacity. In particular, it is possible to acquire firmware via secure communication during the recovery process, and thus it is possible to keep a certain level of security. In addition, the recovery program necessary for the recovery process can be acquired by the information processing terminal 400, which is a mobile terminal, and thus excellent operability is achieved. In addition, when the recovery program is transmitted from the information processing terminal 400 to the MFP 300, one communication method can be selected from a plurality of communication methods, which results in excellent operability.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-098621 filed Jun. 20, 2022, which is hereby incorporated by reference herein in its entirety.

What is claimed is:

1. An information processing system comprising an image forming apparatus, a terminal, and a server, comprising:
   a memory that stores an encrypted communication program included in a first firmware and an unencrypted communication program not included in the first firmware;
   a controller that determines whether or not the encrypted communication program is stored in the memory in the image forming apparatus;
   a first communicator that communicates with a second communicator and a third communicator;
   wherein the first communicator transmits, in a case where it is determined that the encrypted communication program is stored in the memory, an authentication request to the third communicator by using the encrypted communication program in order to receive a second firmware, and receives the second firmware from the third communicator;
   a third communicator that receives the authentication request from the first communicator, and transmits the second firmware to the first communicator,
   wherein the controller updates firmware of the image forming apparatus with the received second firmware, and
   wherein the first communicator transmits, in a case where it is determined that the encrypted communication program is not stored in the memory, information of the image forming apparatus to be used for authentication to the second communicator by using the unencrypted communication program; and
   a second communicator that receives the information from the first communicator, and transmits the received information to the third communicator,
   wherein the third communicator receives the information, and transmits a recovery program to the second communicator based on success of the authentication using the received information,
   wherein the second communicator receives the recovery program from the third communicator, and transmits the received recovery program to the first communicator,
   wherein the first communicator receives the recovery program from the second communicator, and
   wherein the memory stores the encrypted communication program included in the received recovery program.

2. An image forming apparatus comprising:
   a memory that stores an encrypted communication program included in a first firmware and an unencrypted communication program not included in the first firmware;
a controller that determines whether or not the encrypted communication program is stored in the memory; and
   a communicator that communicates with a server and a terminal, wherein, in a case where it is determined that the encrypted communication program is stored in the memory, the communicator transmits an authentication request to the server by using the encrypted communication program in order to receive a second firmware, and receives the second firmware from the server, and wherein the controller updates firmware of the image forming apparatus with the received second firmware, wherein, in a case where it is determined that the encrypted communication program is not stored in the memory, the communicator transmits information of the image forming apparatus to be used for authentication to the terminal by using the unencrypted communication program, wherein a recovery program is transmitted by the server to the terminal based on success of the authentication using the transmitted information, the communicator receives the recovery program including the encrypted communication program from the terminal, and wherein the encrypted communication program included in the received recovery program is stored in the memory.

3. The image forming apparatus according to claim 2, wherein the information includes model information of the image forming apparatus.

4. The image forming apparatus according to claim 2, wherein the information includes serial information of the image forming apparatus.

5. The image forming apparatus according to claim 2, further comprising a display that displays the QR code indicating information for connect to the image forming apparatus.

6. The image forming apparatus according to claim 2, wherein the controller determines, in a case where a flag indicating that the firmware is being updated is turned on when the power of the image forming apparatus is turned on, whether or not the encrypted communication program is stored in the memory.

7. The image forming apparatus according to claim 2, wherein the recovery program includes the second firmware.

8. The image forming apparatus according to claim 2, wherein the firmware has a size larger than a size corresponding to half the capacity of the memory.

9. The image forming apparatus according to claim 8, wherein the memory is an Embedded Multimedia Card.

10. The image forming apparatus according to claim 5, wherein the communicator receives the recovery program from the terminal via a wireless communication.

11. The image forming apparatus according to claim 10, wherein the wireless communication is a wireless LAN communication.

12. The image forming apparatus according to claim 2, wherein the communicator receives the recovery program from the terminal via a wired communication.

13. The image forming apparatus according to claim 12, wherein the wired communication is a USB communication.

14. The image forming apparatus according to claim 2, further comprising a printer that forms an image on a sheet.

15. The image forming apparatus according to claim 2, further comprising a scanner that reads an image from a document.

16. The image forming apparatus according to claim 2, wherein the terminal is a mobile terminal.

17. A non-transitory computer-readable storage medium for storing a program causing an image forming apparatus, comprising a memory that is capable of storing an encrypted communication program included in a first firmware and an unencrypted communication program not included in the first firmware, to perform an information processing method, the method comprising:

determining whether or not the encrypted communication program is stored in the memory;

transmitting an authentication request to a server by using the encrypted communication program in order to receive a second firmware in a case where it is determined that the encrypted communication program is stored in the memory;

receiving the second firmware from the server in the case where it is determined that the encrypted communication program is stored in the memory;

updating firmware of the image forming apparatus with the received second firmware in the case where it is determined that the encrypted communication program is stored in the memory;

transmitting information of the image forming apparatus to be used for authentication to a terminal by using the unencrypted communication program in a case where it is determined that the encrypted communication program is not stored in the memory, wherein a recovery program is transmitted by the server to the terminal based on success of the authentication using the transmitted information, storing the encrypted communication program included in the received recovery program in the memory.

<div align="center">*   *   *   *   *</div>